United States Patent
Lee et al.

(10) Patent No.: US 10,553,933 B2
(45) Date of Patent: Feb. 4, 2020

(54) ELECTRONIC DEVICE INCLUDING NFC ANTENNA

(71) Applicant: SAMSUNG ELECTRONICS CO., LTD., Suwon-si (KR)

(72) Inventors: Youngki Lee, Incheon (KR); Jaesuk Lee, Suwon-si (KR); Hyounghwan Roh, Seoul (KR); Iljong Song, Suwon-si (KR); Youngjae Jang, Seoul (KR); Yohan Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/544,431

(22) Filed: Aug. 19, 2019

(65) Prior Publication Data

US 2019/0372202 A1    Dec. 5, 2019

Related U.S. Application Data

(63) Continuation of application No. 15/448,732, filed on Mar. 3, 2017, now Pat. No. 10,389,009.

(30) Foreign Application Priority Data

May 25, 2016    (KR) .......................... 10-2016-0064291
Aug. 12, 2016   (KR) .......................... 10-2016-0103063

(51) Int. Cl.
*H01Q 1/24*      (2006.01)
*H01Q 1/22*      (2006.01)
(Continued)

(52) U.S. Cl.
CPC ........... *H01Q 1/243* (2013.01); *H01Q 1/2283* (2013.01); *H01Q 1/38* (2013.01); *H01Q 7/06* (2013.01)

(58) Field of Classification Search
CPC .. H01Q 1/24; H01Q 1/22; H01Q 1/38; H01Q 7/06
(Continued)

(56) References Cited

U.S. PATENT DOCUMENTS 8,995,910 B2    3/2015  Chong et al.
9,455,498 B2    9/2016  Yosui
(Continued)

FOREIGN PATENT DOCUMENTS

JP    5704284 B2       4/2015
KR    10-1470341 B1   12/2014
(Continued)

*Primary Examiner* — Andrea Lindgren Baltzell
(74) *Attorney, Agent, or Firm* — Sughrue Mion, PLLC

(57) ABSTRACT

Disclosed is an electronic device which includes: a metal body including a hole defined by an inner edge thereof and extending in a first direction, wherein the metal body is defined by an outer edge thereof; and a near field communication (NFC) antenna including a coil wound about a central axis and arranged near the metal body to overlap the hole in a plan view of the metal body, wherein the inner edge and the outer edge are not connected to each other and the NFC antenna is arranged at the center of the hole along a second direction perpendicular to the first direction, and wherein the NFC antenna is arranged such that four cross points at which the NFC antenna and the inner edge cross in the plan view are formed.

20 Claims, 29 Drawing Sheets

(51) Int. Cl.
*H01Q 1/38* (2006.01)
*H01Q 7/06* (2006.01)

(58) Field of Classification Search
USPC .......................................................... 343/702
See application file for complete search history.

(56) References Cited

U.S. PATENT DOCUMENTS

| | | |
|---|---|---|
| 2013/0113662 A1 | 5/2013 | Kato et al. |
| 2013/0307746 A1* | 11/2013 | Nakano ................ H01Q 1/2225 343/850 |
| 2015/0009077 A1 | 1/2015 | Lee et al. |
| 2015/0214620 A1 | 7/2015 | Yosui |
| 2016/0112219 A1 | 4/2016 | Lee et al. |
| 2016/0119012 A1 | 4/2016 | Zhou et al. |
| 2016/0134730 A1 | 5/2016 | Lee et al. |
| 2017/0093455 A1* | 3/2017 | Lee ........................ H01Q 1/243 |

FOREIGN PATENT DOCUMENTS

| | | |
|---|---|---|
| KR | 10-2015-0009422 A | 1/2015 |
| KR | 101485569 B1 | 1/2015 |
| KR | 1020150043206 A | 4/2015 |
| KR | 10-1580518 B1 | 12/2015 |
| KR | 1020160034360 A | 3/2016 |
| KR | 101619322 B1 | 5/2016 |

\* cited by examiner

ELECTRONIC DEVICE INCLUDING NFC ANTENNA

CROSS-REFERENCE TO THE RELATED APPLICATIONS

This is a continuation of U.S. application Ser. No. 15/448,732 filed Mar. 3, 2017, which claims priority under 35 U.S.C. § 119 is made to Korean Patent Application Nos. 10-2016-0064291 and 10-2016-0103063 filed on May 25, 2016 and Aug. 12, 2016, respectively, in the Korean Intellectual Property Office, the entire contents of which are incorporated herein by reference.

BACKGROUND

Exemplary embodiments of the inventive concept described herein relate to an electronic device including a near field communication (NFC) antenna, and in particular, an electronic device configured to perform NFC by using a body of the electronic device formed of a metal.

The NFC which is a field of radio-frequency identification (RFID) uses a frequency of 13.56 MHz. The NFC which is a short-range wireless technology to send data with low power at a close range is defined in the ISO 18092 as a standard. The NFC may perform short range wireless communication by using various frequencies of 125 MHz, 135 MHz, and 900 MHz in addition to a frequency of 13.56 MHz.

There is an increasing trend in which a metal case (or a metal body) is used as a case of an electronic device such as a smartphone or a tablet PC. In this case, however, an NFC signal is shielded by the metal body in the NFC upon performing communications using the NFC, thereby causing a decrease in performance such as a decrease in a recognition distance in the NFC.

SUMMARY

Exemplary embodiments of the inventive concept provide an electronic device that performs NFC efficiently by using a metal body.

Exemplary embodiments of the inventive concept provide an electronic device of which the performance is improved through an NFC antenna and a metal body for generating double resonance.

According to an aspect of an exemplary embodiment, an electronic device includes: a metal body which has a hole defined by an inner edge thereof and extends in a first direction to have a uniform distance and is defined by an outer edge thereof, and a near field communication (NFC) antenna which includes a coil wound about a central axis and is arranged near the metal body to overlap the hole in a plan view of the metal body. The inner edge and the outer edge are not connected to each other and the NFC antenna is arranged at a center of the hole along a second direction perpendicular to the first direction. The NFC antenna is arranged such that four cross points at which the NFC antenna and the inner edge cross in a plan view are formed.

According to another aspect of an exemplary embodiment, an electronic device includes a metal body which has an opening defined by an inner edge thereof, wherein the opening has a length in a first direction and has a distance in a second direction perpendicular to the first direction, an NFC antenna which includes a coil wound about a central axis and is arranged near the metal body to overlap the opening in a plan view of the metal body, and a capacitor element which connects two points of the inner edge. The NFC antenna is arranged at a center of the opening along the second direction.

According to still another aspect of an exemplary embodiment, an electronic device includes a metal body which has a first slit extending in a first direction and defined by a first inner edge and a second slit extending in the first direction and defined by a second inner edge are formed, and a first NFC antenna which includes a first coil wound about a central axis and is arranged near the metal body to overlap the first slit in a plan view of the metal body. Each of the first inner edge and the second inner edge is connected with an outer edge of the metal body and the first NFC antenna is arranged at the center of the first slit along the second direction.

According to yet another aspect of an exemplary embodiment, an electronic device includes a metal body with at least one opening having a length in a first direction and a distance in a second direction, and at least one near field communication (NFC) antenna which corresponds to the opening, and at least a part of which is arranged to overlap the opening when the opening is viewed in a direction perpendicular to a plane where the opening is formed, wherein the NFC antenna is arranged at the center of the opening along the second direction perpendicular to the first direction.

BRIEF DESCRIPTION OF THE DRAWINGS

The above and other objects and features will become apparent from the following description with reference to the following drawings, wherein like reference numerals refer to like parts throughout the various figures unless otherwise specified, and wherein.

DETAILED DESCRIPTION

Below, exemplary embodiments of the inventive concept are described in detail and clearly to such an extent that the ordinary skill in the art easily implements the inventive concept.

Figure 1:
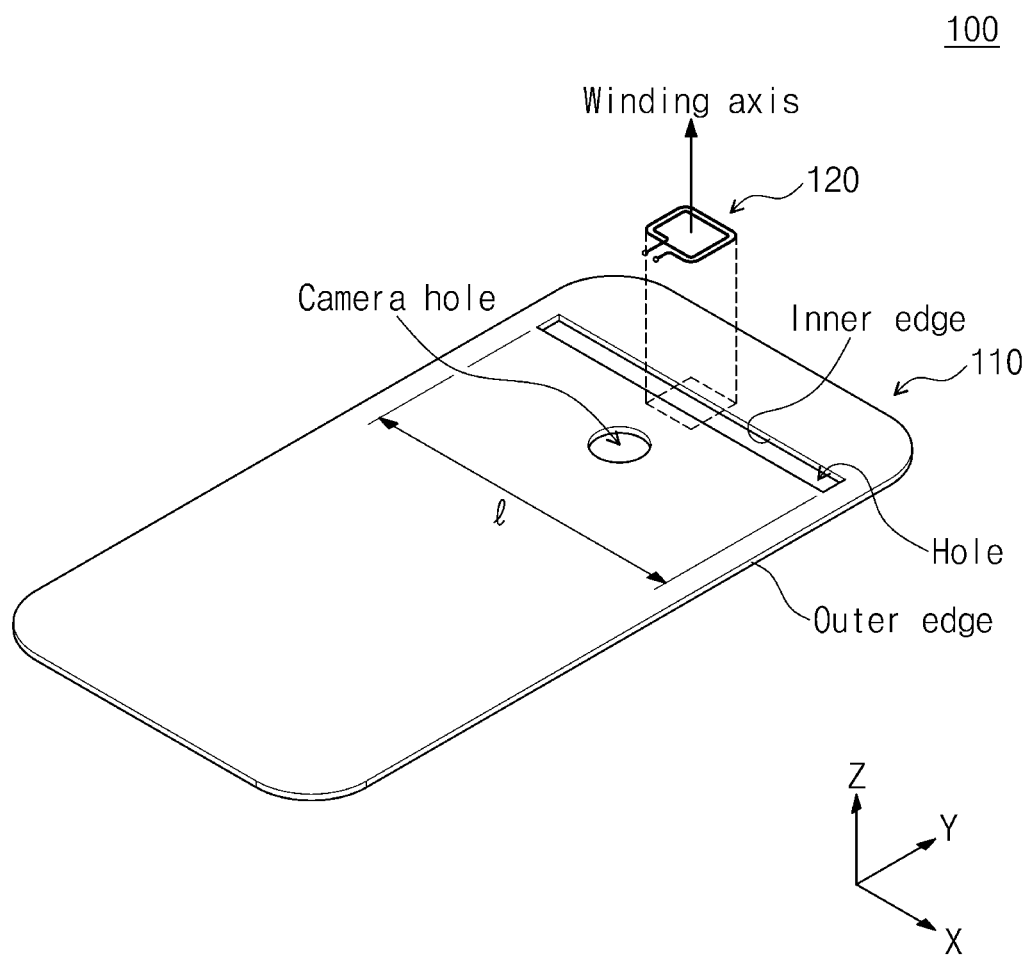
FIG. 1 is a view illustrating an electronic device according to an exemplary embodiment of the inventive concept.

FIG. 1 is a view illustrating an electronic device according to an exemplary embodiment of the inventive concept. An electronic device 100 illustrated in FIG. 1 may be a part of a smartphone, a tablet PC, or a wearable device. For example, the electronic device 100 may include a rear cover or a case of an electronic device such as a smartphone, a tablet PC, or a wearable device.

Referring to FIG. 1, the electronic device 100 includes a metal body 110 and an NFC antenna 120. The electronic device 100 further includes an NFC controller, a matching circuit, a display, an application processor, etc. which are not illustrated in FIG. 1 for ease of illustration.

The metal body 110 may take a form of a plate formed of a metal. For example, the metal body 110 may be a cover which is arranged on a rear surface of a smartphone. The appearance of the metal body 110 may be defined by an outer edge thereof. That is, the outer edge may form one closed curve. For example, as illustrated in FIG. 1, the metal body 110 has a rectangular shape having four round corners in a plan view of the metal body 110. However, exemplary embodiments of the inventive concept may not be limited thereto. For example, the metal body 110 may be rectangular. Alternatively, in the case where the electronic device 100 is a wearable device, for example, the metal body 110 may be circular.

The metal body 110 has a hole which is defined by an inner edge of the metal body 110. In this specification, the hole may be referred to as "opening". That is, the inner edge of the metal body 110 may form one closed curve. For example, the hole is formed to extend in a first direction (e.g., an x-axis direction), in which case a length of the hole in the first direction is "l", and a distance thereof in a second direction (e.g., a y-axis direction) is "d". The distance "d" of the hole may be within several millimeters. For example, the distance "d" of the hole may be approximately 3 mm but is not limited thereto. For example, as illustrated in FIG. 1, the hole has a rectangular shape which extends in the first direction (e.g., the x-axis direction) in a plan view of the metal body 100. However, according to an exemplary embodiment, the hole may have a rectangular shape at which four corners are round. Although not illustrated in FIG. 1, the hole may be filled with a nonmetallic material, and thus the nonmetallic material filled in the hole and the metal body 110 may form one plane.

The metal body 110 may be used as a main antenna (e.g., an RF antenna) which is used to send and receive data between the electronic device 100 and the outside. However, since the exemplary embodiments of the inventive concept relate to NFC antenna structure and arrangement, a detailed description associated with the use of the metal body 110 as the main antenna of the electronic device 100 is omitted herein.

The NFC antenna 120 includes a coil which is wound in a loop shape. For example, the coil may be wound about an axis in a direction perpendicular to the body 110, that is, a z-axis. For example, the NFC antenna 120 may be implemented by a flexible printed circuit board (FPCB) antenna which is formed by printing lines of a loop shape on an FPCB as illustrated in FIG. 1. Alternatively, according to an exemplary embodiment, the NFC antenna 120 may be implemented by a chip antenna. This will be more fully described later.

The NFC antenna 120 is arranged adjacent to the hole formed in the metal body 110. That is, in a plan view of the metal body 110, the NFC antenna 120 is arranged in such a way that a part of the NFC antenna 120 overlaps the hole, and may be arranged in such a way that another part of the NFC antennal 120 overlaps an area of the metal body 110 other than the hole. To prevent the NFC antenna 120 from being electrically connected with the metal body 110, an insulation material may be provided between the NFC antenna 120 and the metal body 110. With the above-described arrangement, during an operation of the NFC antenna 120, electromagnetic field coupling (or magnetic field coupling) may be generated between the NFC antenna 120 and the metal body 110. The electromagnetic field (or the magnetic field) formed by the coupling may radiate through the hole formed in the metal body 110. That is, the metal body 110 may operate as a radiator.

The metal body may also include a camera hole for camera shooting. However, in describing the exemplary embodiments of the inventive concept, the camera hole may be omitted. Since the camera hole is not directly associated with the exemplary embodiments of the inventive concept, a detailed description thereof is omitted.

Figure 2A:
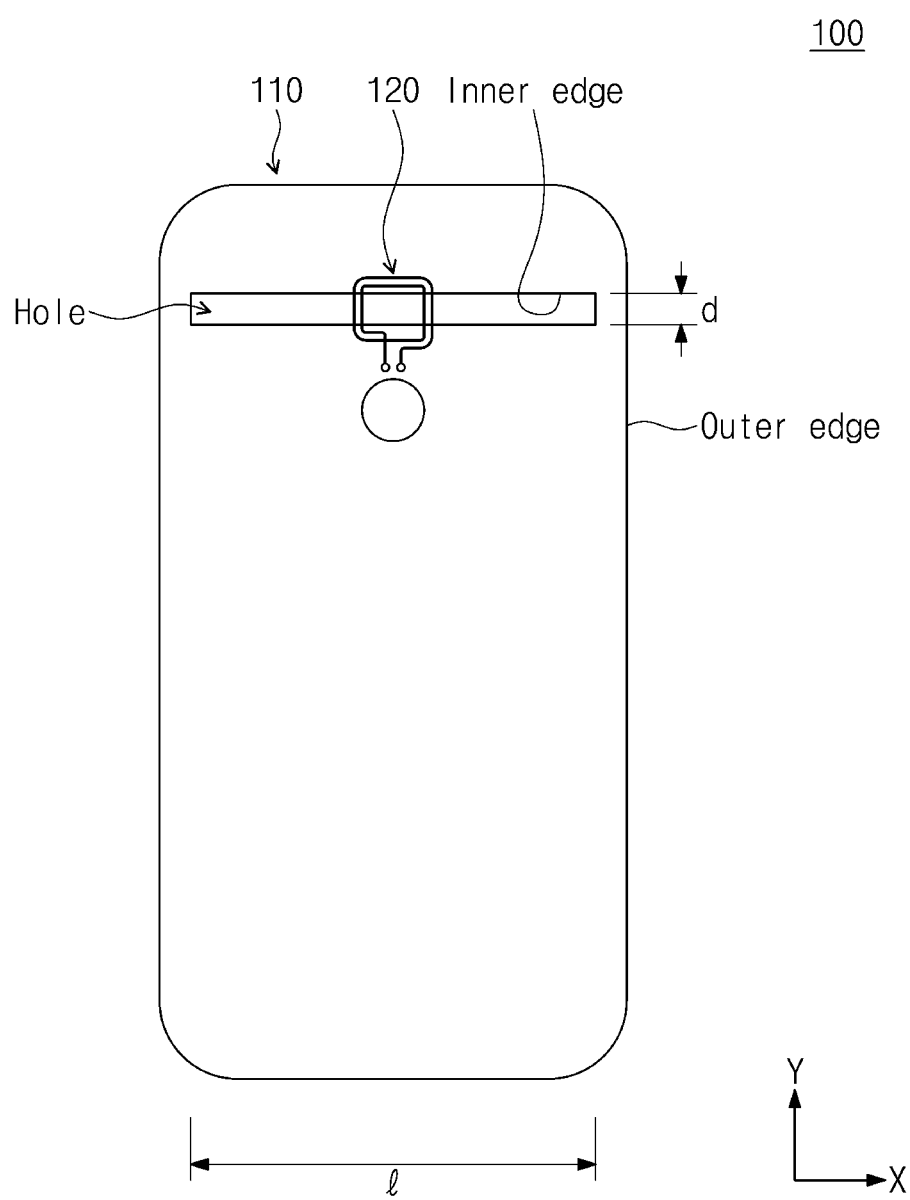
FIG. 2A is a plan view illustrating the electronic device illustrated in FIG. 1, according to an exemplary embodiment of the inventive concept.

FIG. 2A is a plan view illustrating the electronic device 100 illustrated in FIG. 1. Referring to FIG. 2A, in the NFC antenna 120, a part of a coil, which is arranged in the first direction (e.g., the x-axis direction), overlaps the metal body 110 and does not overlap the hole. In the NFC antenna 120, only a part of the coil, which is arranged in a second direction (e.g., a y-axis direction), overlaps the hole.

The NFC antenna 120 is arranged at the center of the hole along the first direction (e.g., the x-axis direction). The NFC antenna 120 does not, of course, have to be arranged at the center of the hole along the x-axis direction. However, the performance difference between the two cases may be very little. The NFC antenna 120 may be arranged at the center of the hole along the second direction (e.g., the y-axis direction). The NFC antenna 120 does not, of course, have to be arranged at the center of the hole along the y-axis direction. In this case, however, the performance may decrease compared to the case where the NFC antenna is arranged at the center of the hole along the y-axis direction.

Figure 2B:
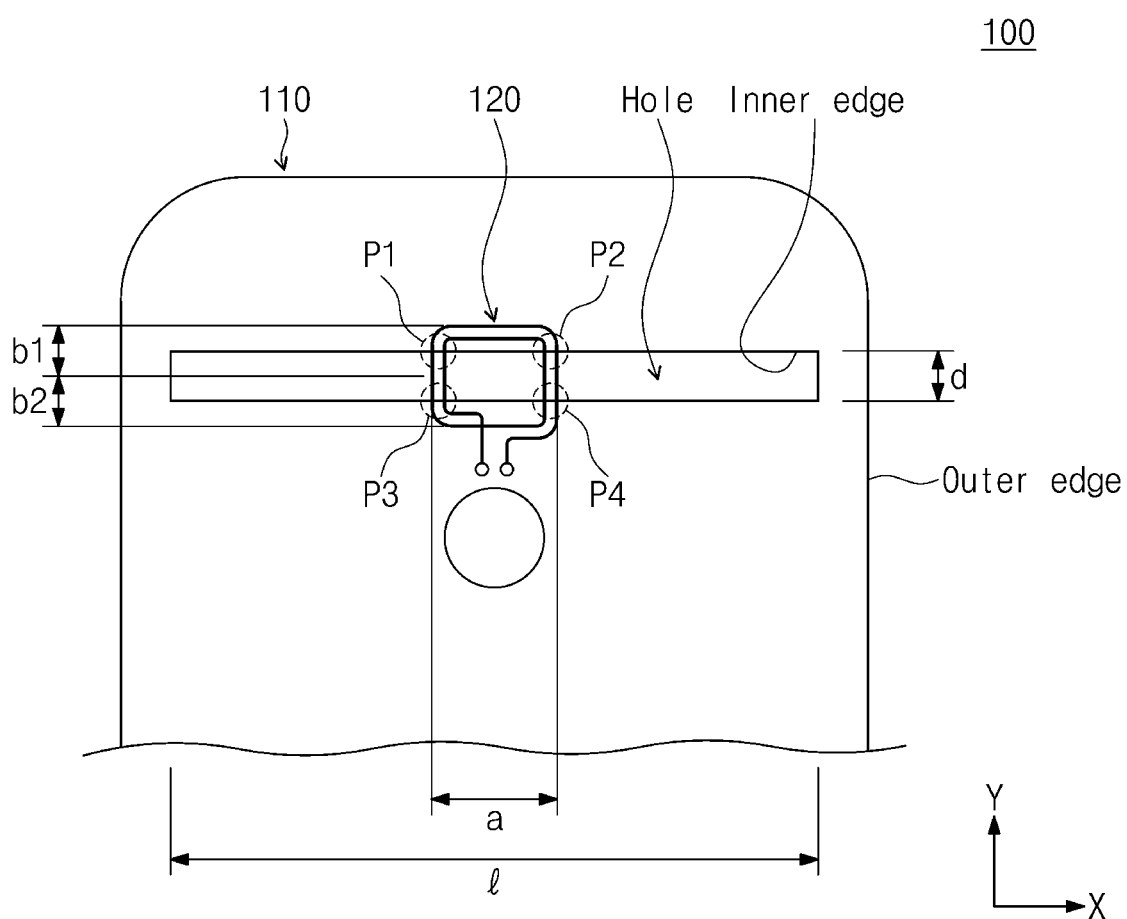
FIG. 2B is a plan view illustrating the electronic device illustrated in FIG. 2A, according to an exemplary embodiment of the inventive concept.

FIG. 2B is a plan view illustrating the electronic device 100 illustrated in FIG. 2A. Referring to FIG. 2B, a length of the NFC antenna 120 in the first direction (e.g., the x-axis direction) is "a", and a distance thereof in the second direction (e.g., the y-axis direction) may be "b1+b2". The NFC antenna 120 is illustrated as being arranged at the center of the hole along the y-axis direction. That is, a length b1 of the NFC antenna 120 from the center of the NFC antenna 120 (or the center of the hole) to the +y-axis direction may be the same as a length b2 of the NFC antenna 120 from the center of the NFC antenna 120 (or the center of the hole) to the −y-axis direction.

For example, four cross points P1 to P4 may be defined by the overlap between the inner edge of the metal body 110 (or the circumference of the hole) and the NFC antenna 120 in a plan view of the metal body 110. If the NFC antenna 120 is arranged to excessively go toward the left side or right side of the hole along the x-axis direction or if a length of the NFC antenna 120 is longer than a length of the hole, the number of cross points that are defined by the overlap between the inner edge and the NFC antenna 120 may be "2" or "0". In sum, according to an exemplary embodiment of the inventive concept, the NFC antenna 120 may be suitably arranged at any location with respect to the hole along the x-axis direction such that four cross points are defined by the overlap between the inner edge and the NFC antenna 120.

For example, to secure the performance of the NFC antenna 120, a ratio of the length "l" of the hole to the length "a" of the NFC antenna 120 in the first direction (e.g., the x-axis direction) may be not less than 4.5:1 and less than 1:1. The reason is that if the ratio of the length "l" of the hole to the length "a" of the NFC antenna 120 is 1:1, the number of cross points defined by the overlap between the inner edge and the NFC antenna 120 may be less than "4". More preferably, a ratio of the length "l" of the hole to the length "a" of the NFC antenna 120 may be not less than 2.5:1 and less than 1:1.

Figure 3:
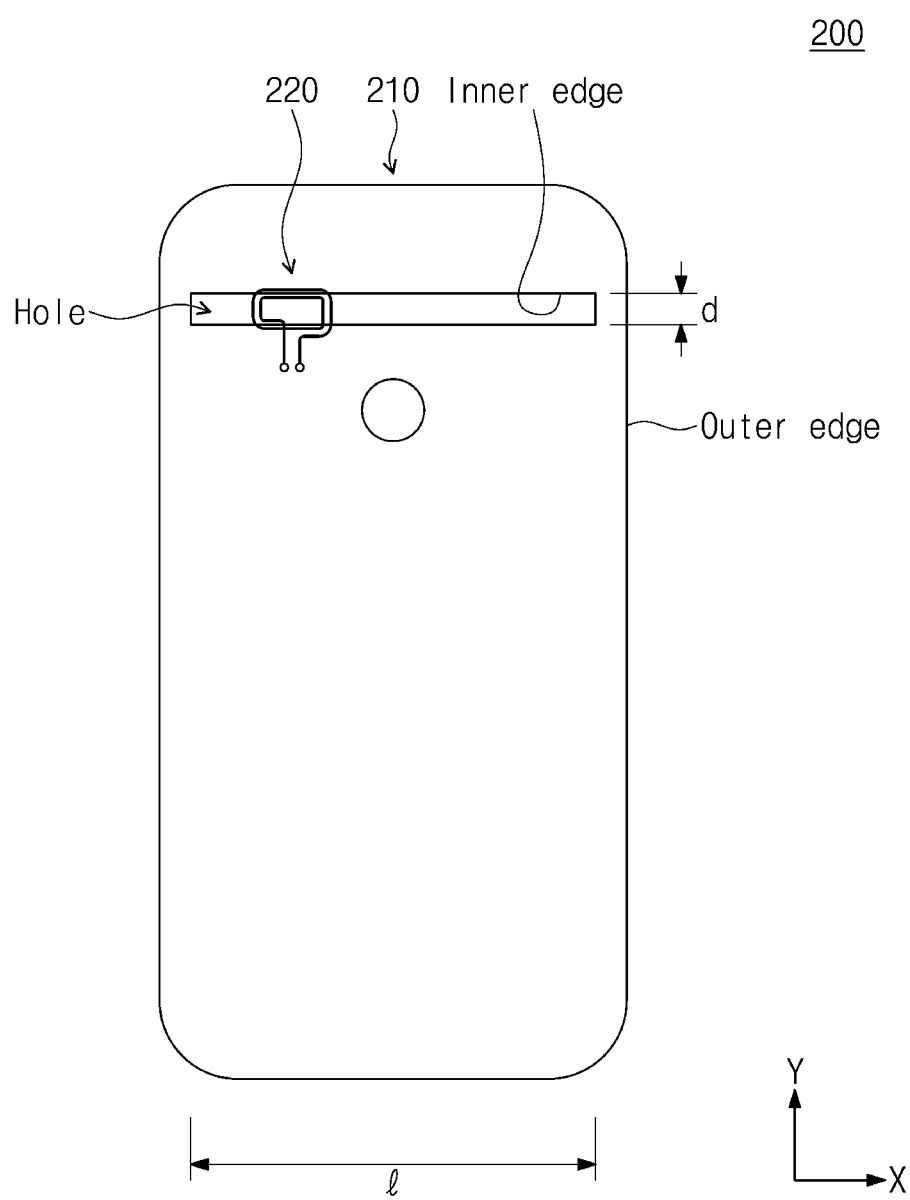
FIG. 3 is a plan view illustrating another example of an electronic device illustrated in FIG. 1, according to an exemplary embodiment of the inventive concept.

FIG. 3 is a plan view illustrating another example of an electronic device corresponding to the electronic device 100 illustrated in FIG. 1. An electronic device 200 referring to FIG. 3 includes a metal body 210 and an NFC antenna 220.

Referring to FIG. 3, in the NFC antenna 220, a part of a coil, which extends in the first direction (e.g., the x-axis direction), overlaps the metal body 210 and the hole. That is, a part of the coil, which is arranged in the first direction (e.g., the x-axis direction), overlaps the metal body 220, and the other part thereof overlaps the hole. Even though the coil is arranged as illustrated in FIG. 3, since the part of the coil of the NFC antenna 120, which is arranged in the first direction (e.g., the x-axis direction) overlaps the metal body 220, a difference between the performance of the NFC antenna 220 and the performance of the NFC antenna 120 of FIG. 2 may be very little.

Further referring to FIG. 3, the NFC antenna 220 is not arranged at the center of the hole along the first direction (e.g., the x-axis direction). As described with reference to FIG. 2A, the NFC antenna 220 may be arranged at any location with respect to the hole along the x-axis direction such that four cross points are defined by the overlap between the inner edge of the metal body 110 and the NFC antenna 220. The NFC antenna 120 does not, of course, have to be arranged at the center of the hole along the x-axis direction, but the performance difference between two cases may be very little. The NFC antenna 120 may be arranged at the center of the hole along the second direction (e.g., the y-axis direction). The NFC antenna 120 does not, of course, have to be arranged at the center of the hole along the y-axis direction. In this case, however, the performance may decrease compared to the case where the NFC antenna is arranged at the center of the hole along the y-axis direction.

According to the embodiments described with reference to FIGS. 1 to 3, the hole may be formed in the metal body. The hole may be defined by the inner edge of the metal body, and the inner edge may not be connected with the outer edge of the metal body. Since the metal body is formed of one piece, it is easy to manufacture. The NFC antenna may overlap the metal body and the hole. The NFC antenna may be situated at the center of the hole along a distance direction of the hole, but it may be arranged at any location along a length direction of the hole. Since the NFC antenna is arranged at any location along a length direction of the hole, the degree of freedom of the arrangement of the NFC antenna may increase. That is, the performance of the NFC antenna may be maintained even though a space is limited by the arrangement of other components included in the electronic device.

Figure 4A:
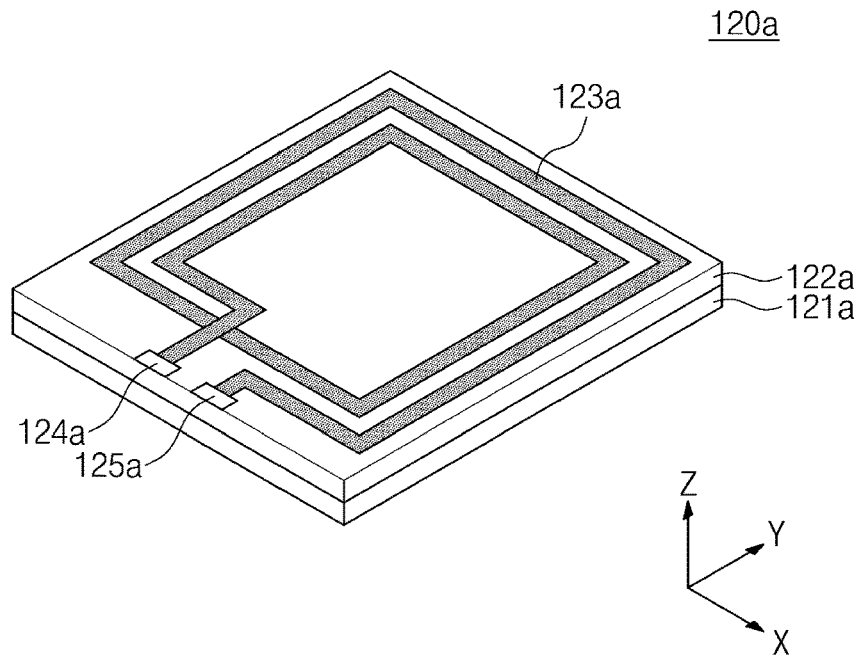
FIGS. 4A and 4B are views illustrating embodiments of a near field communication (NFC) antenna illustrated in FIGS. 1 to 3, according to exemplary embodiments of the inventive concept.
Figure 4B:
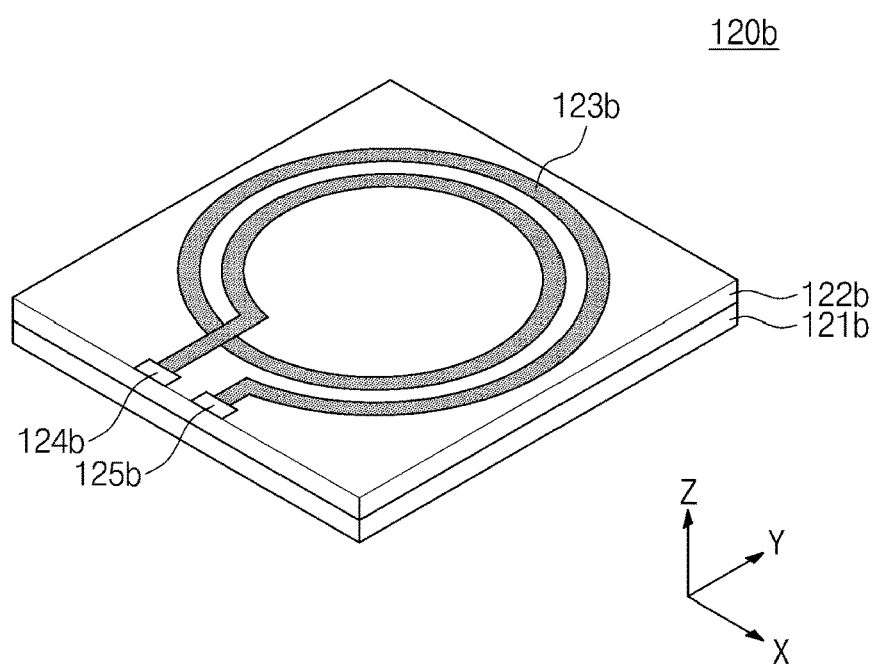

FIGS. 4A and 4B are views illustrating embodiments of an NFC antenna illustrated in FIGS. 1 to 3. For example, each of NFC antennas illustrated in FIGS. 4A and 4B may be an FPCB antenna.

Referring to FIG. 4A, an NFC antenna 120a includes a magnetic sheet 121a, an FPCB 122a, a coil 123a wound in a loop shape, and terminals 124a and 124b attached to opposite ends of the coil 123a. Although not illustrated in FIG. 4A, the NFC antenna 120a may further include an insulating layer for isolating the coil 123a from any other material. The insulating layer may be arranged under the magnetic sheet 121a.

The magnetic sheet 121a may include a magnetic material. For example, the magnetic sheet 121a may include ferrite. Alternatively, the magnetic sheet 121a may include at least one of magnetic materials such as Nd—Fe—B, samarium, Al—Ni—Co, sendust (Fe—Si—Al), and permalloy (Ni—Fe). The above-described magnetic materials may be only exemplary without being limited thereto. The magnetic sheet 121a may be attached with the FPCB 122a and may be formed to be flexible. Each of the magnetic sheet 121a and the FPCB 122a may have, but not limited to, a tetragonal shape.

The coil 123a may be wound about the z-axis perpendicular to a plane (i.e., an xy plane) in which the NFC antenna 120a is attached to a metal plate 110 (refer to FIG. 1). According to an exemplary embodiment as illustrated in FIG. 4A, the number of turns of the coil 123a is, but is not limited to, "2". For example, the number of turns of the coil 123a may be determined to satisfy a target inductance value.

To help understand a description associated with the arrangement of the NFC antenna 120a, a description will be given with reference to FIGS. 2A and 2B. The NFC antenna 120a may be arranged at any location of the hole formed in the metal body 110 along the first direction (e.g., the x-axis direction). That is, the NFC antenna 120 may be arranged at the center of the hole along the x-axis direction or may not be arranged at the center of the hole. The NFC antenna 120a may be arranged at the center of the hole along the second direction (e.g., the y-axis direction). In more detail, the NFC antenna 120a may be arranged such that the coil 123a included in the NFC antenna 120a is situated at the center of the hole along the y-axis direction.

In the embodiment of FIG. 4A, the coil 123a is illustrated as being wound in a tetragonal shape, but the coil 123a may be wound to form loops of various shapes. One example is illustrated in FIG. 4B.

Referring to FIG. 4B, an NFC antenna 120b includes a magnetic sheet 121b, an FPCB 122b, a coil 123b wound in a circular loop shape, and terminals 124b and 124b attached to opposite ends of the coil 123b. The NFC antenna 120b may be substantially the same as the NFC antenna 120a of FIG. 4A except for a wound shape of the coil 123b. Thus, a duplicated description thereof may not be repeated here.

As illustrated in FIG. 4B, the coil 123b is wound to form a circular loop. However, exemplary embodiments of the inventive concept may not be limited thereto. For example, the coil 123b may be wound in various shapes such as an ellipse and a tetragon of which the corners are round. An exemplary embodiment is illustrated in FIG. 4B as the number of turns of a coil is "2". However, exemplary embodiments of the inventive concept may not be limited thereto. For example, the number of turns of the coil 123b may be determined to satisfy a target inductance value. The NFC antenna 120b may be arranged at any location of the hole formed in the metal body 110 (refer to FIG. 2) along the first direction (e.g., the x-axis direction). The NFC antenna 120b may be arranged at the center of the hole along the second direction (e.g., the y-axis direction). In more detail, the NFC antenna 120b may be arranged such that the coil 123b is situated at the center of the hole along the y-axis direction.

Figure 5A:
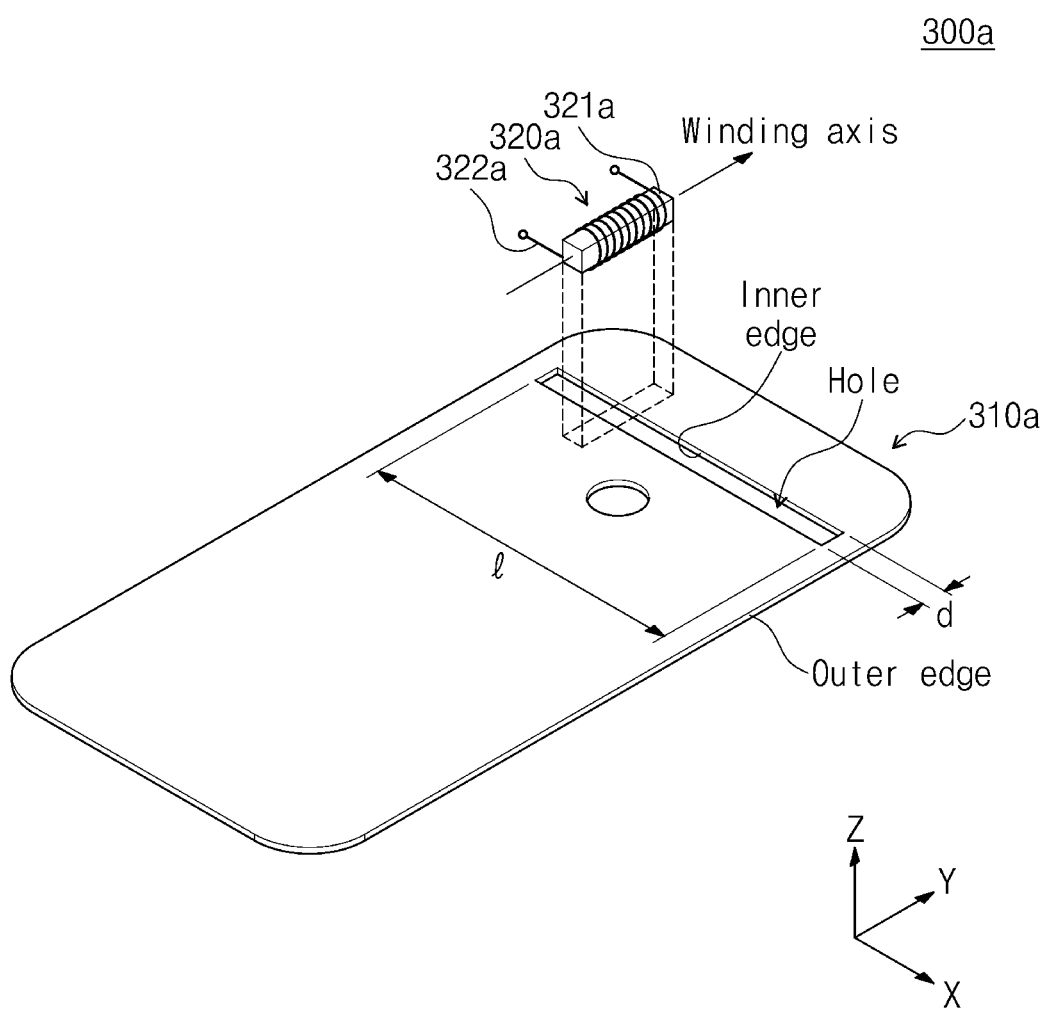
FIGS. 5A to 5C are views illustrating electronic devices according to exemplary embodiments of the inventive concept.
Figure 5B:
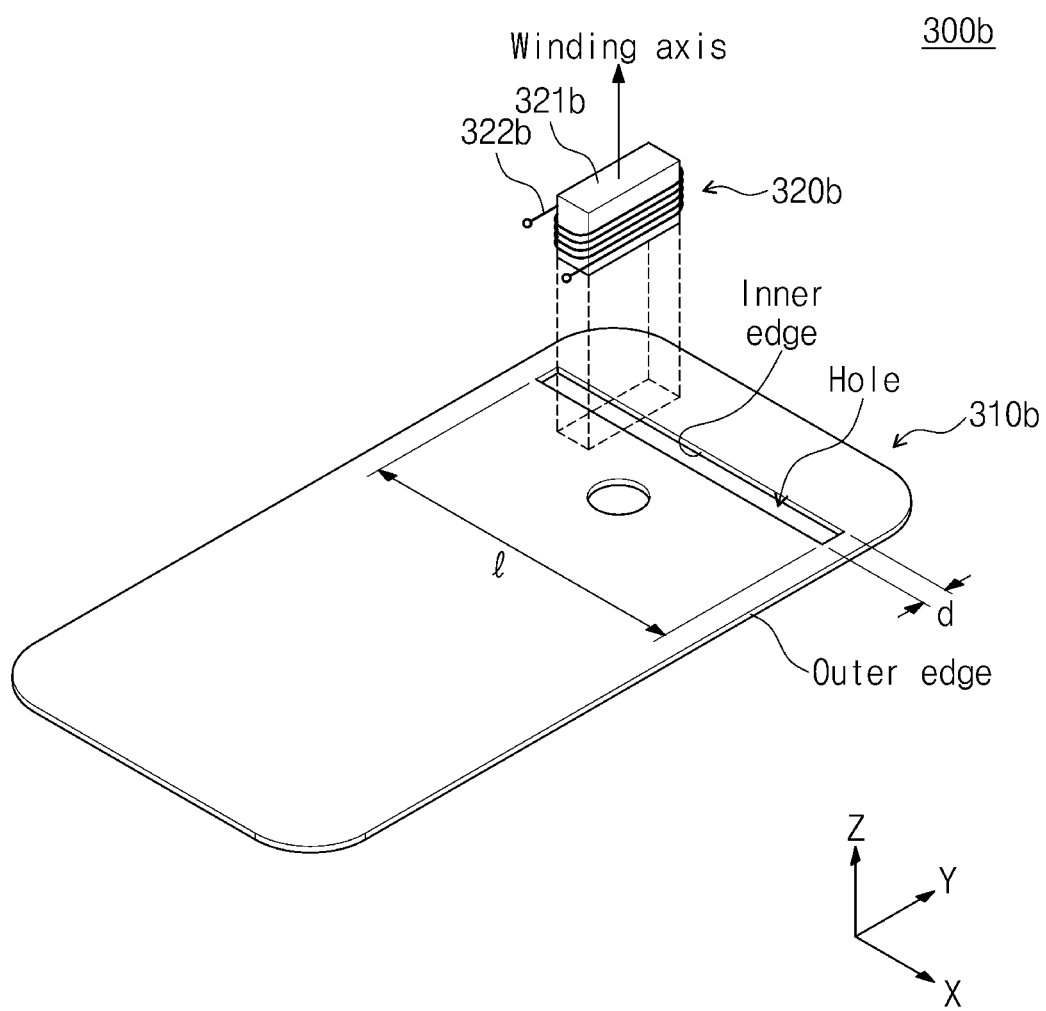
Figure 5C:
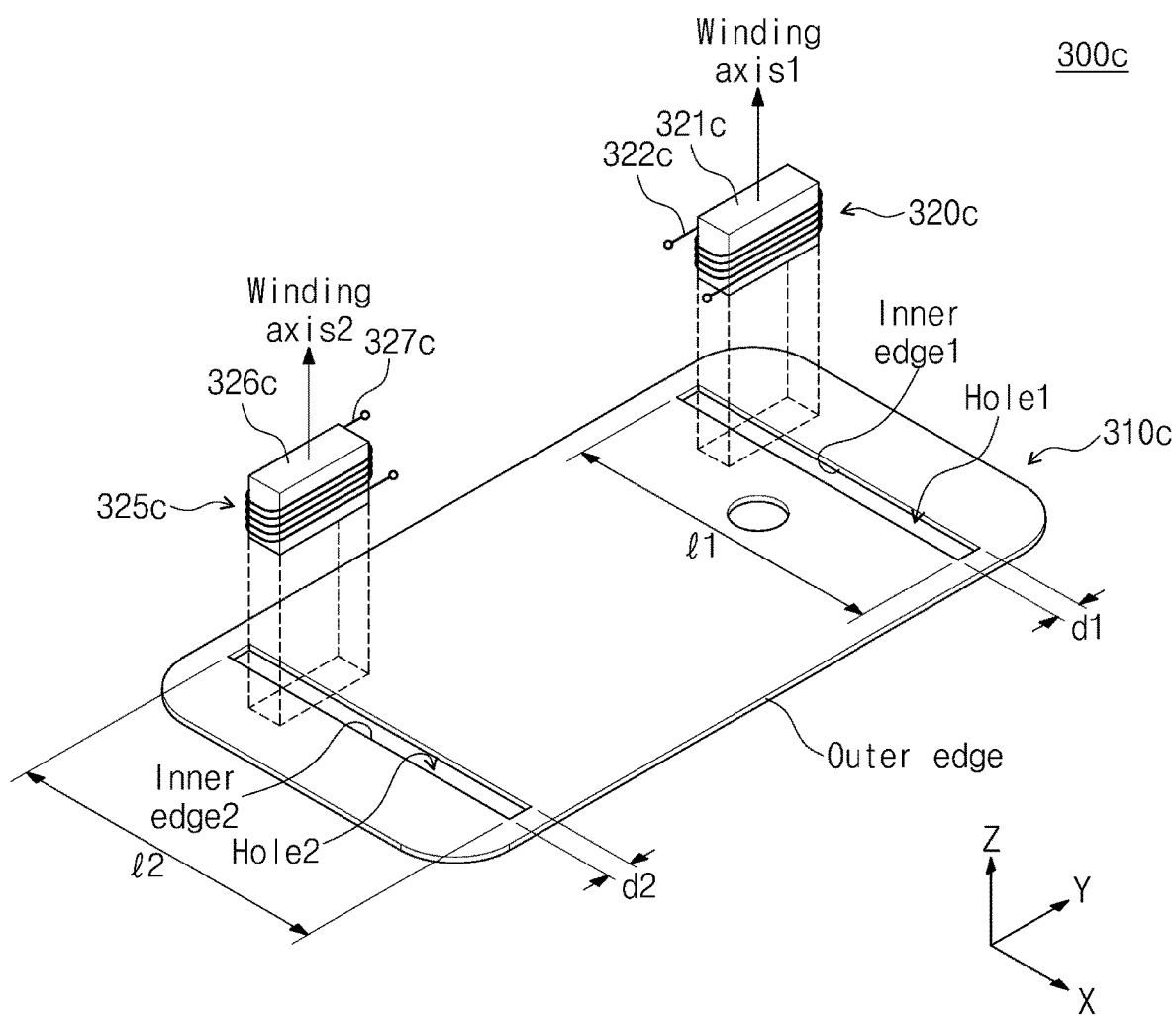

FIGS. 5A to 5C are views illustrating electronic devices according to exemplary embodiments of the inventive concept. Each of the electronic devices illustrated in FIGS. 5A to 5C may be a part of an electronic device such as a smartphone, a tablet PC, or a wearable device.

Referring to FIG. 5A, an electronic device 300a includes a metal body 310a and an NFC antenna 320a. The electronic device 300a further includes an NFC controller, a matching circuit, a display, an application processor, etc. which are not illustrated in FIG. 5A for ease of illustration.

The metal body 310a may have the form of a plate formed of a metal. The appearance of the metal body 310a may be defined by an outer edge thereof. A hole which is defined by an inner edge may be formed in the metal body 310a, and the hole may extend in the first direction (e.g., the x-axis direction). A length of the hole may be "l", and a distance thereof may be "d". Although not illustrated in FIG. 5A, the hole may be filled with a nonmetallic material, and thus the non-metallic material filled in the hole and the metal body 310a may form one plane. The metal body 310a may be substantially the same as the metal body 110 illustrated in FIG. 1, and thus, a detailed description thereof may not be repeated here.

The NFC antenna 320a may be implemented by a chip antenna. In this case, the NFC antenna 320a may include a magnetic body 321a and a coil 322a wound on the magnetic body 321a. As illustrated in FIG. 5A, the magnetic body 321a may be arranged along a direction (i.e., the y-axis direction) perpendicular to a direction (i.e., the x-axis direction) in which the hole extends. The magnetic body 321a may include at least one of magnetic materials such as ferrite, Nd—Fe—B, samarium, Al—Ni—Co, sendust (Fe—Si—Al), and permalloy (Ni—Fe). The coil 322a may be wound on the magnetic body 321a as the center with the y-axis. The number of turns of the coil 322a may be determined to satisfy a target inductance value.

The NFC antenna 320a may be arranged on the hole formed in the metal body 310a. That is, in a plan view, the NFC antenna 320a may be arranged in such a way that a part of the NFC antenna 320a overlaps the hole and may be arranged in such a way that another part thereof overlaps the metal body 310a. For example, the NFC antenna 320a may be arranged at any location of the hole formed in the metal body 310a along the x-axis direction. For example, four cross points may be defined by the overlap between the inner edge of the metal body 310a and the NFC antenna 320a. Cross points defined by the overlap between the FPCB antenna and the inner edge are described with reference to FIG. 2B, and cross points defined by the overlap between the NFC 320a of a chip antenna type and the inner edge may be similar to those described with reference to FIG. 2B. Thus, a detailed description thereof may not be repeated here. The NFC antenna 320a may be arranged at the center of the hole along the second direction (e.g., the y-axis direction).

With the above-described arrangement, during an operation of the NFC antenna 320a, electromagnetic field coupling (or magnetic field coupling) may be generated between the NFC antenna 120 and the metal body 310a. The electromagnetic field (or the magnetic field) formed by the coupling may radiate through the hole formed in the metal body 310a. That is, the metal body 310a may operate as a radiator.

A direction in which the NFC antenna 320a implemented by a chip antenna is arranged and a central axis about which the coil 322a is wound may be variously changed. One example is illustrated in FIG. 5B. Referring to FIG. 5B, an electronic device 300b may include a metal body 310b and an NFC antenna 320b. Likewise, components such as an NFC controller, a matching circuit, a display, an application processor are not illustrated in FIG. 5B for ease of illustration. The embodiment of FIG. 5B may be substantially the same as the embodiment of FIG. 5A except for a direction of a central axis about which the coil 322b is wound, and thus, a duplicated description may be omitted.

The NFC antenna 320b includes a magnetic body 321b and a coil 322b wound on the magnetic body 321b. As illustrated in FIG. 5B, the magnetic body 321b is arranged at the center of the hole along a direction (i.e., the y-axis direction) perpendicular to a direction (i.e., the x-axis direction) in which the hole extends. The coil 322b may be wound on the magnetic body 321b about a direction (i.e., the z-axis direction) perpendicular to the metal body 310b. In this case, the performance of the NFC antenna 320*b* may be more excellent than the performance of the NFC antenna 320*a* illustrated in FIG. 5A.

Meanwhile, according to an exemplary embodiment, a plurality of holes and a plurality of NFC antennas may be formed in the metal body. This embodiment is exemplified in FIG. 5C. Referring to FIG. 5C, two holes extending in the x-axis direction may be formed in the metal body 310*c*, and the NFC antennas 320*c* and 325*c* may be arranged in two holes.

The embodiment illustrated in FIG. 5C is only for describing that a plurality of holes are formed in a metal body 310*c* and a plurality of NFC antennas 320*c* and 325*c* are arranged to overlap the holes, and exemplary embodiments of the inventive concept may not be limited thereto. For example, the NFC antennas 320*c* and 325*c* are illustrated in FIG. 5C as being chip antennas, but at least one of the NFC antennas 320*c* and 325*c* may be an FPCB antenna. For example, the NFC antennas 320*c* and 325*c* are illustrated as coils are wound about the z-axis, but a direction in which a coil is wound may be variously changed. For example, two holes are illustrated as extending in the x-axis direction, but directions in which holes extend may be different from each other.

The cases where directions in which a coil is wound are y-axis and z-axis are described with reference to FIGS. 5A to 5C. However, exemplary embodiments of the inventive concept may not be limited thereto. For example, a coil may be wound about the x-axis, and in some exemplary embodiments, a coil may be wound about any other axis different from x-axis, y-axis, and z-axis. For example, the case where a metal body has a curved plate or where an electronic device is implemented by a flexible device may correspond to the above-described case.

Figure 6:
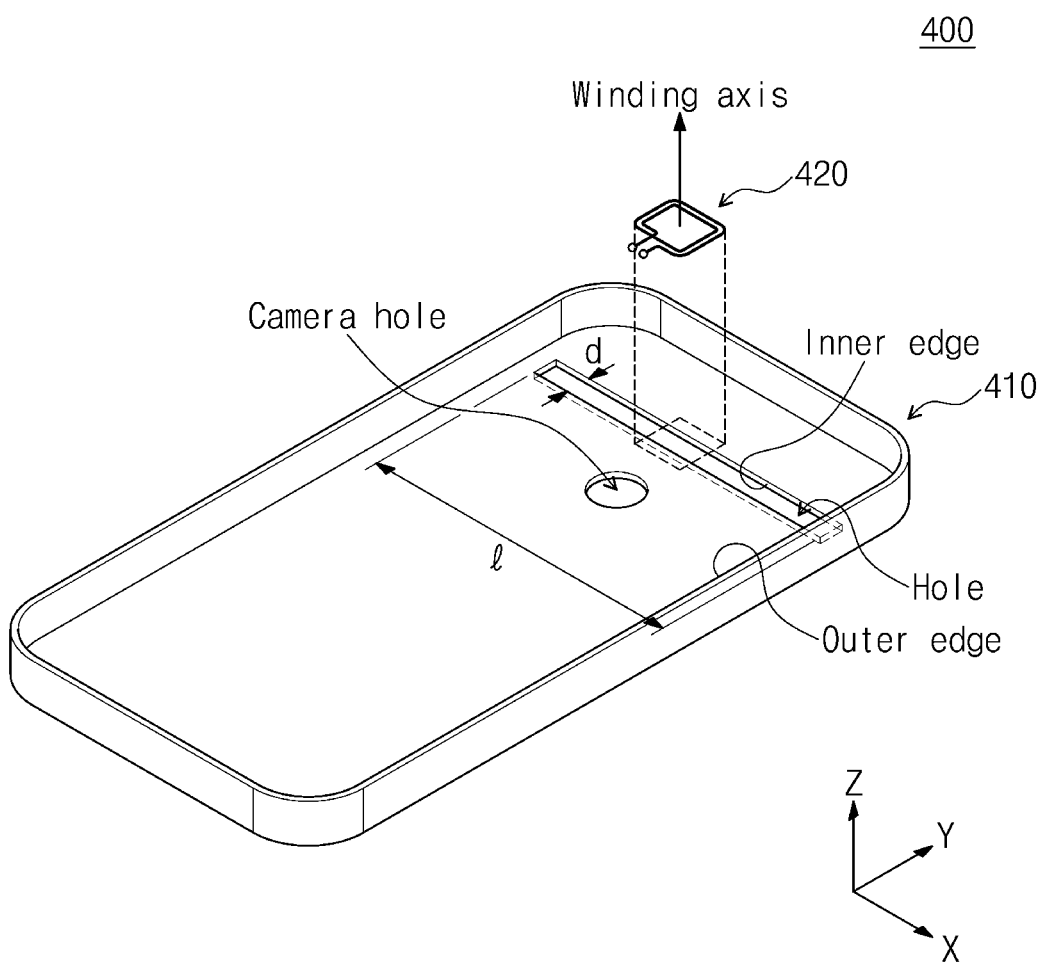
FIG. 6 is a view illustrating an electronic device according to an exemplary embodiment of the inventive concept.

FIG. 6 is a view illustrating an electronic device according to an exemplary embodiment of the inventive concept. Referring to FIG. 6, an electronic device 400 includes a metal body 410 and an NFC antenna 420. The electronic device 400 may further include an NFC controller, a matching circuit, a display, an application processor, etc. which are not illustrated in FIG. 6 for ease of illustration.

The metal body 410 may include a plate formed of a metal and side walls which are formed along a periphery (or edges) of the plate in a direction perpendicular to the plate. Unlike those of the previously-described embodiments, the appearance of the metal body 410 may be defined by an outer edge of the side walls. A hole having a length "l" and a distance "d" may be formed in the metal body 410 along the first direction (the x-axis direction). Although not illustrated in FIG. 6, the hole may be filled with a nonmetallic material.

The NFC antenna 420 is illustrated in FIG. 6 as being arranged at the center of the hole along the x-axis direction, but the NFC antenna 420 may be arranged at any location of the hole along the x-axis direction (refer to FIG. 3). The NFC antenna 420 may be arranged at the center of the hole along the y-axis direction. The NFC antenna 420 is illustrated in FIG. 6 as being implemented by an FPCB antenna. However, the NFC antenna 420 may be implemented by the same chip antenna as those illustrated in FIGS. 5A and 5B. A configuration, the number of turns, arrangement, etc. of the NFC antenna 420 are described in detail in the previous embodiments, and thus, a duplicated description may not be repeated here.

Figure 7:
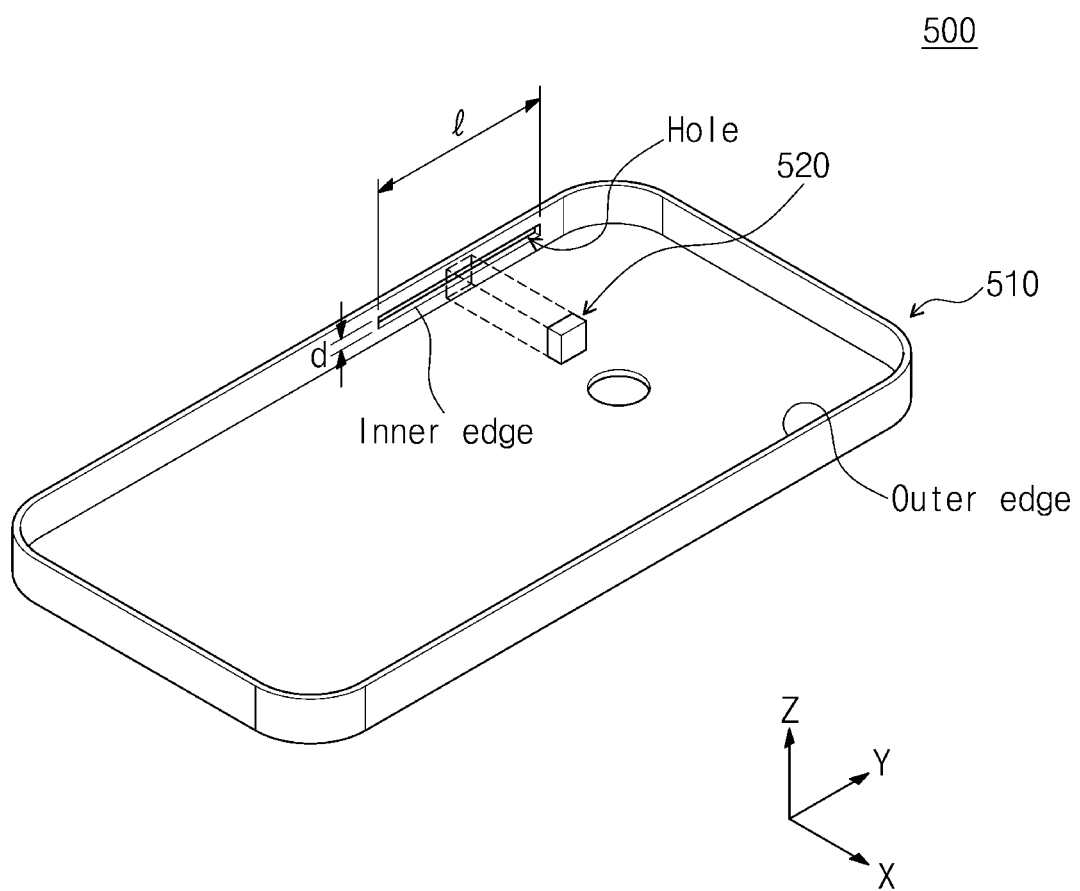
FIG. 7 is a view illustrating an electronic device according to an exemplary embodiment of the inventive concept.

FIG. 7 is a view illustrating an electronic device according to an exemplary embodiment of the inventive concept. Referring to FIG. 7, an electronic device 500 includes a metal body 510 and an NFC antenna 520. The NFC antenna 520 is roughly illustrated for ease of illustration. The NFC antenna 520 may be implemented by an FPCB antenna or a chip antenna.

Unlike the metal bodies illustrated in FIGS. 1, 2A, 2B, 3, 5A, and 5B, the metal body 510 of FIG. 7 includes side walls that are formed in the z-axis direction. Accordingly, a hole through which an electromagnetic field (or a magnetic field) formed by the coupling between the NFC antenna 520 and the metal body 510 radiates may be formed at various locations. For example, the hole may be formed in the xy plane of the metal body 510 as in the previously-described embodiments. Alternatively, the hole may be formed in the xz plane or the yz plane. The case where a hole is formed in the yz plane will be described with reference to FIG. 7.

Referring to FIG. 7, a hole is formed in one side wall of the metal body 510 along the second direction (e.g., the y-axis direction). The hole has a length "l" and a distance "d". The hole is defined by an inner edge of the metal body 510. Since the hole is formed in the metal body 510 and is defined by the inner edge which is a closed curve, the inner edge and the outer edge is connected to each other. The hole may be filled with a nonmetallic material, and thus the nonmetallic material filled in the hole and the side wall of the metal body 510 may form one plane that extends along the yz plane. In this embodiment, the hole is formed in an upper part of the side wall of the metal body 510 in the second direction. However, exemplary embodiments are not limited thereto. For example, the hold may be formed at the center or a lower part of the side wall of the metal body 510 in the second direction.

In the case where the NFC antenna 520 is implemented by an FPCB antenna, the NFC antenna 520 may have the same configuration and shape as those described with reference to FIG. 4A or 4B. Thus, a detailed description thereof may not be repeated here. However, a shape in which the NFC antenna 520 is wound may not be limited thereto. The NFC antenna 520 may be arranged to overlap the hole and a side wall of the metal body 510 along the y-axis direction. For example, the NFC antenna 520 may be arranged at any location of the hole along the y-axis direction (refer to FIG. 3). The NFC antenna 520 may be arranged at the center of the hole along the z-axis direction. For example, a coil (not illustrated) of the NFC antenna 520 may be wound about the x-axis, and the number of turns of the coil may be determined to satisfy a target inductance value.

In the case where the NFC antenna 520 is implemented by a chip antenna, the NFC antenna 520 may have the same configuration and shape as those described with reference to FIG. 5A or 5B. The NFC antenna 520 may be arranged to overlap the hole and the side portion of the metal body 510 along the y-axis direction. That is, in the case where the metal body 510 is viewed from the yz plane, at least a part of the NFC antenna 520 may overlap the side wall of the metal body 510 and the hole. For example, the NFC antenna 520 may be arranged at any location of the hole along the y-axis direction (refer to FIG. 3). The NFC antenna 520 may be arranged at the center of the hole along the z-axis direction. For example, a coil (not illustrated) of the NFC antenna 520 may be wound about the x-axis, and the number of turns of the coil may be determined to satisfy a target inductance value. However, an axis about which a coil is wound may not be limited thereto. For example, a coil may be wound about any other axis different from the x-axis, the y-axis, and the z-axis.

Figure 8A:
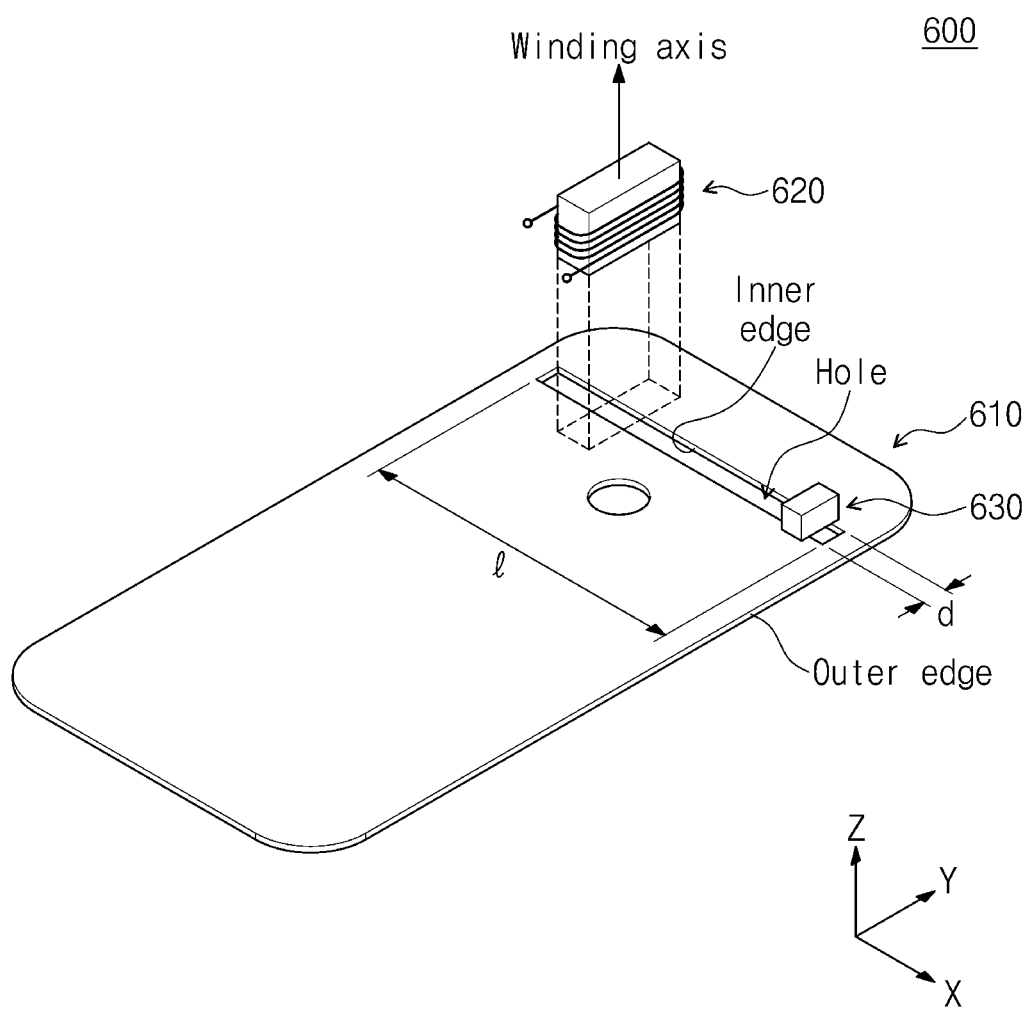
FIG. 8A is a view illustrating an electronic device according to an exemplary embodiment of the inventive concept.

FIG. 8A is a view illustrating an electronic device according to an exemplary embodiment of the inventive concept. An electronic device 600 includes a metal body 610, an NFC antenna 620, and a capacitor element 630. For ease of illustration, the capacitor element 630 is roughly illustrated with a hexahedron. In FIG. 8A, the NFC antenna 620 is implemented by a chip antenna. However, embodiments of the inventive concept may not be limited thereto. For example, the NFC antenna 620 may be implemented by an FPCB antenna. A configuration of the metal body 610, a shape of the hole, a location at which the NFC antenna 620 is arranged, an axis about which a coil is wound, etc. may be substantially the same as those described in the above embodiments, and thus a duplicated description may be omitted.

The capacitor element 630 may be arranged to connect any two points of an inner edge that defines the hole. The capacitor element 630 is illustrated in FIG. 8A as being directly arranged on the metal body 610. However, the capacitor element 630 may be mounted on a separate PCB and may be arranged to connect any two points of the inner edge of the metal body 610. A capacitance value of the capacitor element 630 may be determined to be suitable for generating a double resonance. In this embodiment, how the double resonance is generated through the capacitor element 630 additionally arranged in the metal body 610 will be described.

Figure 8B:
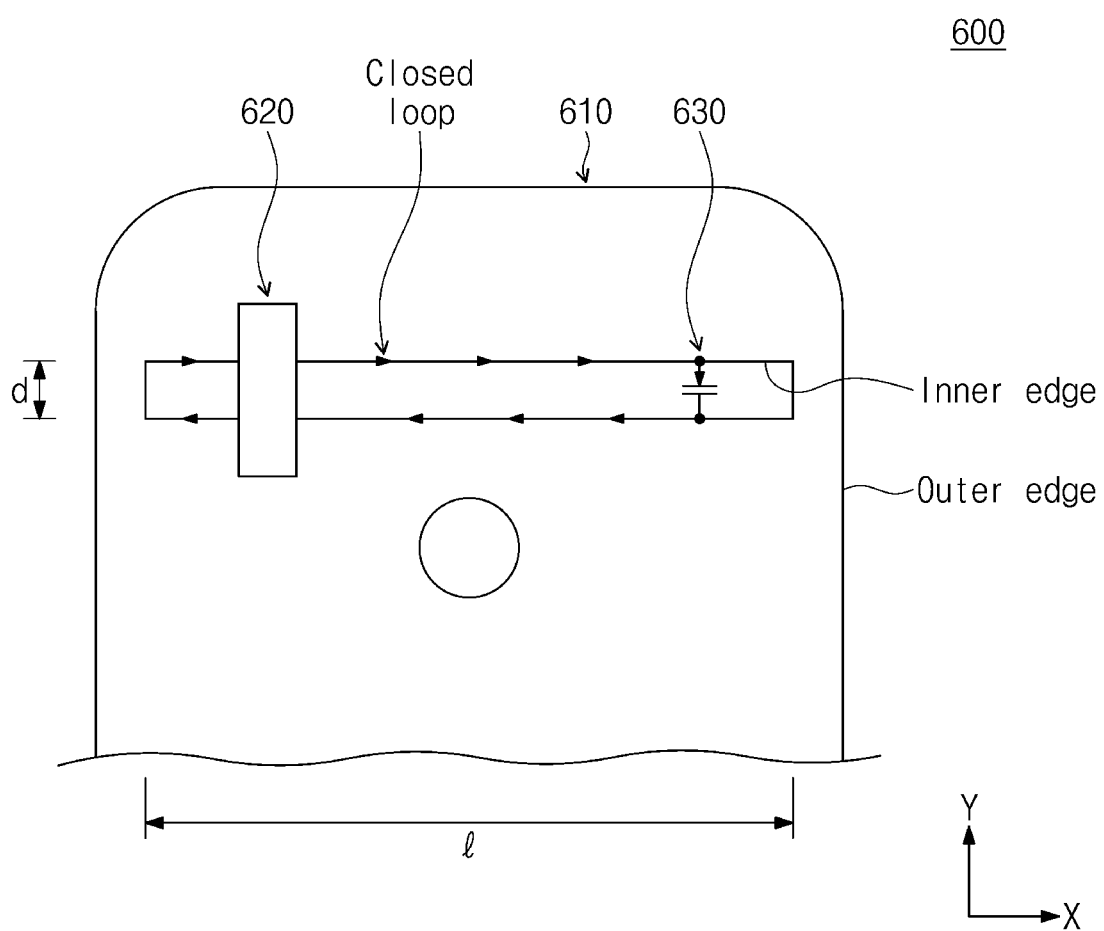
FIG. 8B is a plan view illustrating FIG. 8A, according to an exemplary embodiment of the inventive concept.

FIG. 8B is a plan view illustrating FIG. 8A. For ease of illustration, the capacitor element 630 is illustrated using a symbol which is widely used in a general circuit diagram. In an operation of the NFC antenna 620, an induced current by inductive coupling may be formed in the vicinity of the inner edge of the metal body 610 by an electromagnetic field (or the magnetic field) which is formed by the coupling between the metal body 610 and the NFC antenna 620. The induced current may, of course, be generated on the entire surface of the metal body 610. However, the magnitude of the induced current may be weak, and a considerable portion of the induced current may be generated around the inner edge. That is, the induced current may flow through a closed loop which is composed of the inner edge and the capacitor element 630. Since the metal body 610 has its own inductance component and further a capacitance component of an insignificant magnitude, and the capacitor element 630 is additionally provided to connect any two points of the inner edge, the double resonance may be generated through the closed loop. This will be more fully described with reference to FIG. 8C.

Figure 8C:
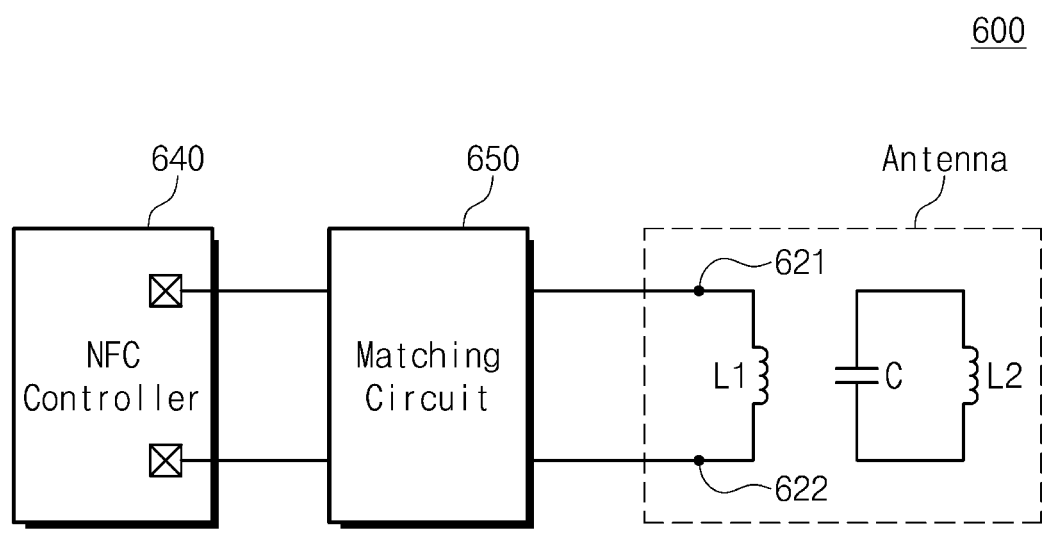
FIG. 8C is a circuit diagram illustrating a simplified modeling circuit of an electronic device including a metal body, an NFC antenna, and a capacitor illustrated in FIG. 8B, according to an exemplary embodiment of the inventive concept.

FIG. 8C is a circuit diagram illustrating a simplified modeling circuit of an electronic device including a metal body, an NFC antenna, and a capacitor illustrated in FIG. 8B. Although not illustrated in FIGS. 8A and 8B, the electronic device 600 of FIG. 8C is illustrated as further including an NFC controller 640 and a matching circuit 650. For better understanding, a description will be given with reference to FIGS. 8A, 8B, and 8C.

An inductor L1 may correspond to the NFC antenna 620 of FIG. 8B. The NFC antenna 620 may, of course, further include its own parasitic capacitance component, but is omitted for ease of illustration. A capacitor C may correspond to the capacitor element 630 of FIG. 8B. The capacitor C may, of course, include a parasitic capacitance component and the like that the metal body 610 has in itself. An inductor L2 may correspond to an inductance component generated by a closed loop illustrated in FIG. 8B. Terminals 621 and 622 may correspond to opposite ends (e.g., 124*a* and 125*a* of FIG. 4A) of a coil. This modeling is, of course, for better understanding, and the modeling circuit may take a different structure or may be implemented in a manner different from that described above.

The NFC controller 640 may be configured to send and receive NFC signals by using the coupling between the metal body 610 and the NFC antenna 620. The NFC controller 640 may provide NFC signals to the antenna, and the antenna may transmit the NFC signals to the outside. For example, the NFC controller 640 may operate under control of an application processor (not illustrated). The NFC controller 640 may be configured to operate in compliance with protocols that are described in NFC interface and protocol-1 (NFCIP-1) and NFC interface and protocol-2 (NFCIP-2) and are standardized in ECMA-340, ISO/IEC 18092, ETSI TS 102 190, ISO 21481, ECMA 352, ETSI TS 102 312, etc.

The matching circuit 650 may perform impedance mismatching or may adjust a bandwidth, a quality factor, etc. For example, the matching circuit 650 may include a capacitor element, an inductor element, and various elements needed for impedance mismatching. The matching circuit 650 may include a filter (e.g., an EMC filter) for removing a harmonic component output upon performing of the NFC communication. To perform the functions, the matching circuit 650 may be implemented in various forms, and since a detailed configuration thereof departs from the scope and spirit of the inventive concept, a detailed description thereof is thus omitted.

In an operation for transmitting and receiving NFC signals, the inductor L1 and a capacitor (not illustrated) included in the matching circuit 650 may constitute a first resonator. For example, the inductor L1 may be referred to as a "source coil". The capacitor C and the inductor L2 may constitute a second resonator. For example, the inductor L2 may be referred to as a "resonance coil". The source coil may be physically separated from the resonance coil. The source coil L1 may be supplied with power from the NFC controller 640, and the resonance coil L2 may be supplied with power from the source coil L1 by electromagnetic induction (or magnetic induction). The source coil L1 and the resonance coil L2 may transmit and receive NFC signals through parallel resonance.

According to the embodiments described with reference to FIGS. 8A to 8C, the NFC communication may be implemented through the double resonance by forming a hole in the metal body 610 and arranging a capacitor connecting any two points of an inner edge defining the hole. As described with reference to FIG. 2B, the NFC antenna 620 may be arranged such that four cross points are defined by the overlap between the NFC antenna 620 and the inner edge of the metal body 610. Since the hole is formed in the metal body 610, the metal body 610 may be formed with one piece, and thus it may be easy to manufacture the metal body 610. In addition, the double resonance may improve the performance of the electronic device, for example, may increase a recognition distance of the NFC communication and the like.

Figure 9A:
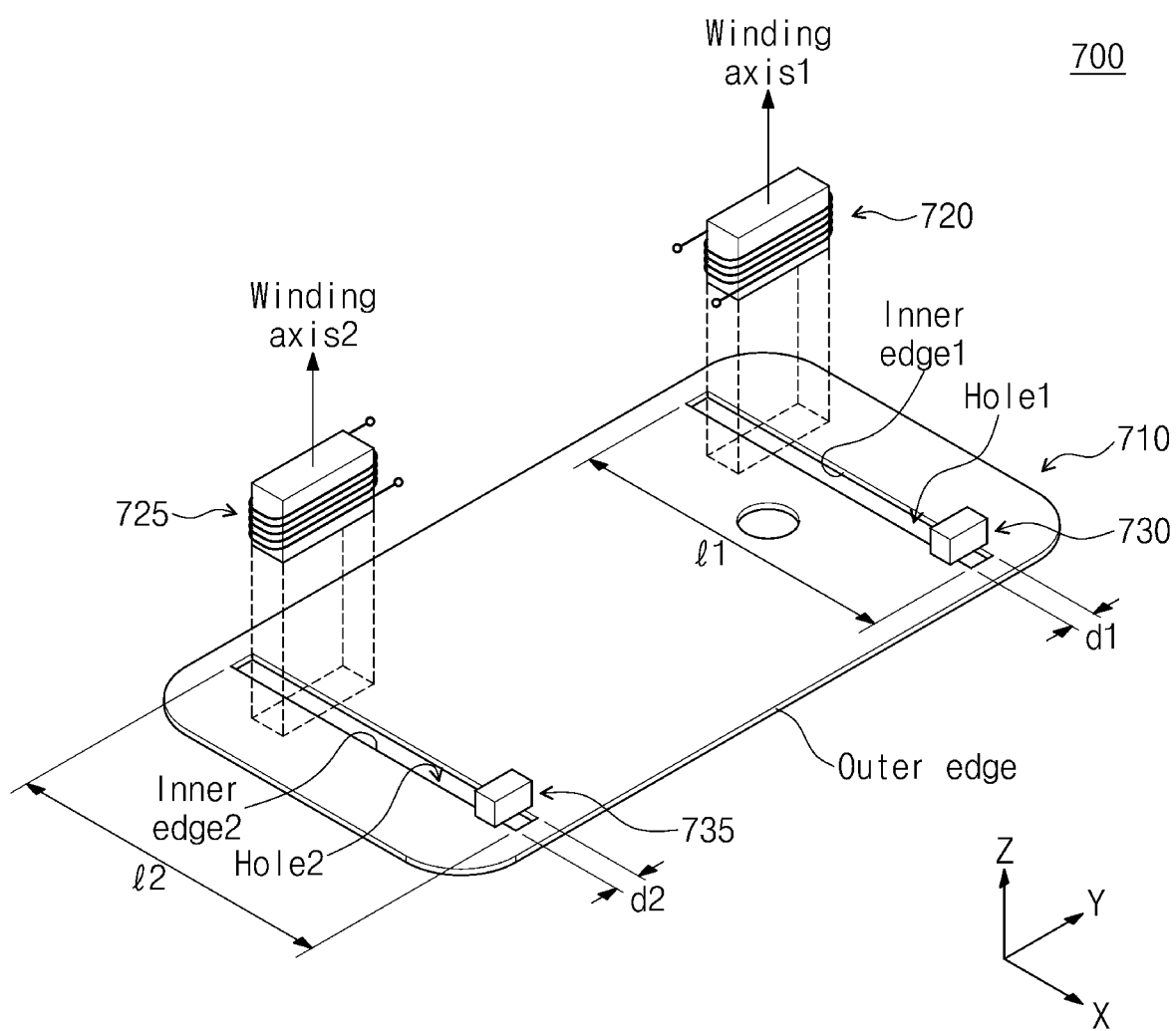
FIG. 9A is a view illustrating an electronic device according to an exemplary embodiment of the inventive concept.

FIG. 9A is a view illustrating an electronic device according to an exemplary embodiment of the inventive concept. Referring to FIG. 9A, an electronic device 700 includes a metal body 710, a first NFC antenna 720, and a second NFC antenna 725. As in the metal body 310*c* described with reference to FIG. 5C, a first hole and a second hole that are respectively defined by a first inner edge and a second inner edge may be formed in the metal body 710. As in that described with reference to FIG. 8A, a first capacitor element 730 and a second capacitor element 735 may be provided in the first hole and the second hole, respectively. Therefore, a hole shape, arrangement of the NFC antennas 720 and 725, and arrangement of the capacitor elements 730 and 735 may not be repeated here.

Figure 9B:
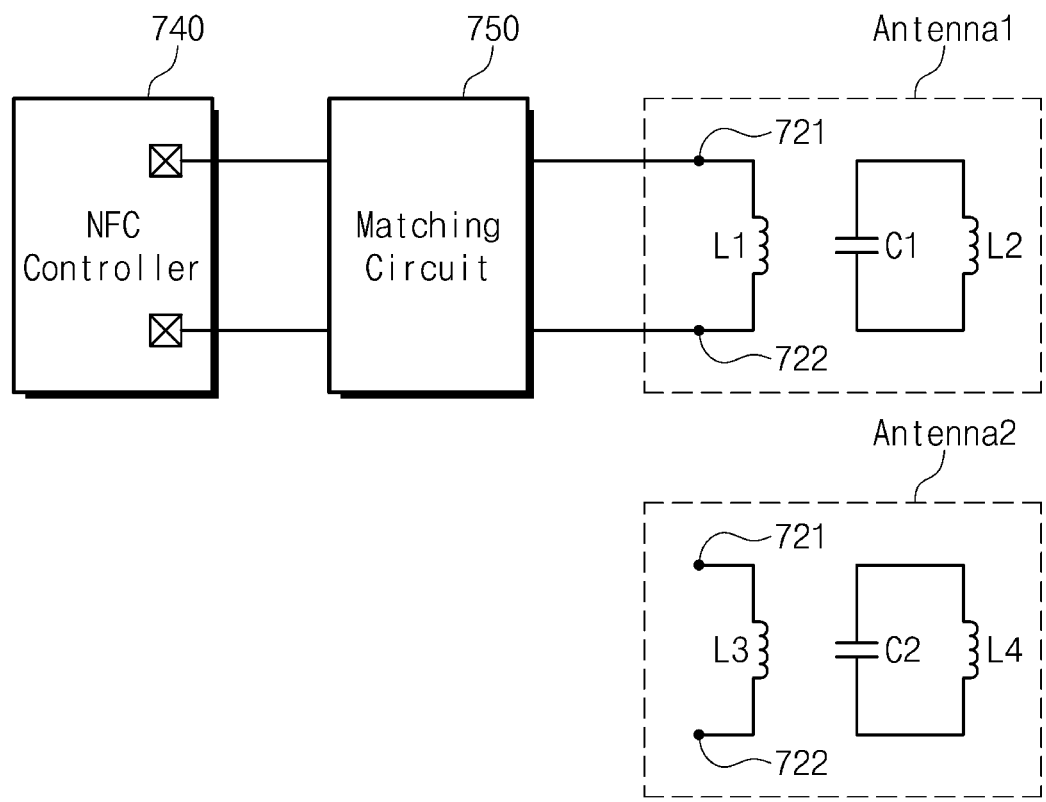
FIG. 9B is a circuit diagram illustrating a simplified modeling circuit of the electronic device illustrated in FIG. 9A, according to an exemplary embodiment of the inventive concept.

FIG. 9B is a circuit diagram illustrating a simplified modeling circuit of the electronic device including the metal body 710, the NFC antennas 720 and 725, and the capacitor elements 730 and 735 illustrated in FIG. 9A. Although not illustrated in FIG. 9A, the electronic device 700 of FIG. 9B is illustrated as further including an NFC controller 740 and a matching circuit 750. For better understanding, a description will be given with reference to FIGS. 9A and 9B.

First of all, components of a first antenna may be described. An inductor L1 may correspond to the first NFC antenna 720 of FIG. 9A. The first NFC antenna 720 illustrated as an inductor L1 may be connected to the matching circuit 750 through terminals 721 and 722. The first NFC antenna 720 may further include its own parasitic capacitance component, but is omitted for ease of illustration. A capacitor C1 may correspond to the first capacitor element 730 of FIG. 9A. The first capacitor C1 may include a parasitic capacitance component and the like that the metal body 710 has in itself. An inductor L2 may correspond to an inductance component by a first closed loop which is formed by the first hole and the first capacitor element 730. Components of a second antenna may be modeled as in those described above. This modeling is only exemplary, and the modeling circuit of the electronic device 700 may take a different structure or may be implemented in a manner different from that described above.

The NFC controller 740 may be configured to send and receive NFC signals by using the coupling between the metal body 710 and the first NFC antenna 720 or by using the coupling between the metal body 710 and the second NFC antenna 725. For example, the NFC controller 740 may be configured to transmit and receive NFC signals that are needed for payment of a mobile POS by using the first antenna Antenna 1. The NFC controller 740 may be further configured to transmit and receive NFC signals that are needed to perform data transmission and reception of a p2p manner by using the second antenna Antenna 2. For example, the operations of the NFC controller 740 may be performed under control of an application processor (not illustrated). However, this is for describing that the first antenna Antenna 1 and the second antenna Antenna 2 may be used for different purposes, and the purposes of the antennas may not be limited thereto.

The matching circuit 750 may perform impedance matching or may adjust a bandwidth, a quality factor, etc. The matching circuit 750 is described in detail with reference to FIG. 8C, and thus, a description thereof may not be repeated here.

In an operation for transmitting and receiving NFC signals, the inductor L1 and a capacitor (not illustrated) included in the matching circuit 750 may constitute a first resonator. For example, the inductor L1 may be referred to as a "first source coil". The capacitor C1 and an inductor L2 may constitute a second resonator. For example, the inductor L2 may be referred to as a "first resonance coil". The first source coil L1 may be supplied with power from the NFC controller 740, and the first resonance coil L2 may be supplied with power from the first source coil L1 by electromagnetic induction (or magnetic induction). The first source coil L1 and the first resonance coil L2 may transmit and receive NFC signals through parallel resonance. For example, the parallel resonance by the first source coil L1 and the first resonance L2 may be used to generated NFC signals needed for payment of the mobile POS.

An inductor L3 and a capacitor (not illustrated) included in the matching circuit 750 may constitute a third resonator. For example, the inductor L3 may be referred to as a "second source coil". A capacitor C2 and an inductor L4 may constitute a fourth resonator. For example, the inductor L4 may be referred to as a "second resonance coil". The second source coil L3 may be supplied with power from the NFC controller 740, and the second resonance coil L4 may be supplied with power from the second source coil L3 by electromagnetic induction (or magnetic induction). The second source coil L3 and the second resonance coil L4 may transmit and receive NFC signals through parallel resonance. For example, the parallel resonance by the second source coil L3 and the second resonance L4 may be used to generated NFC signals needed to transmit and receive data in the p2p manner.

As such, in the case where NFC antennas are used for different purposes, a type of an NFC antenna (i.e., an FPCB antenna or a chip antenna) may be selected to be suitable for the purpose. For example, in FIG. 9A, each NFC antenna is the chip antenna. However, at least one of the NFC antennas may be implemented by the FPCB antenna. The number of turns of a coil, a direction of a central axis about which a coil is wound, distances "d1" and "d2" and lengths "l1" and "l2" of holes, etc. may be appropriately determined to be suitable for the purpose or performance of the NFC antenna.

Figure 10A:
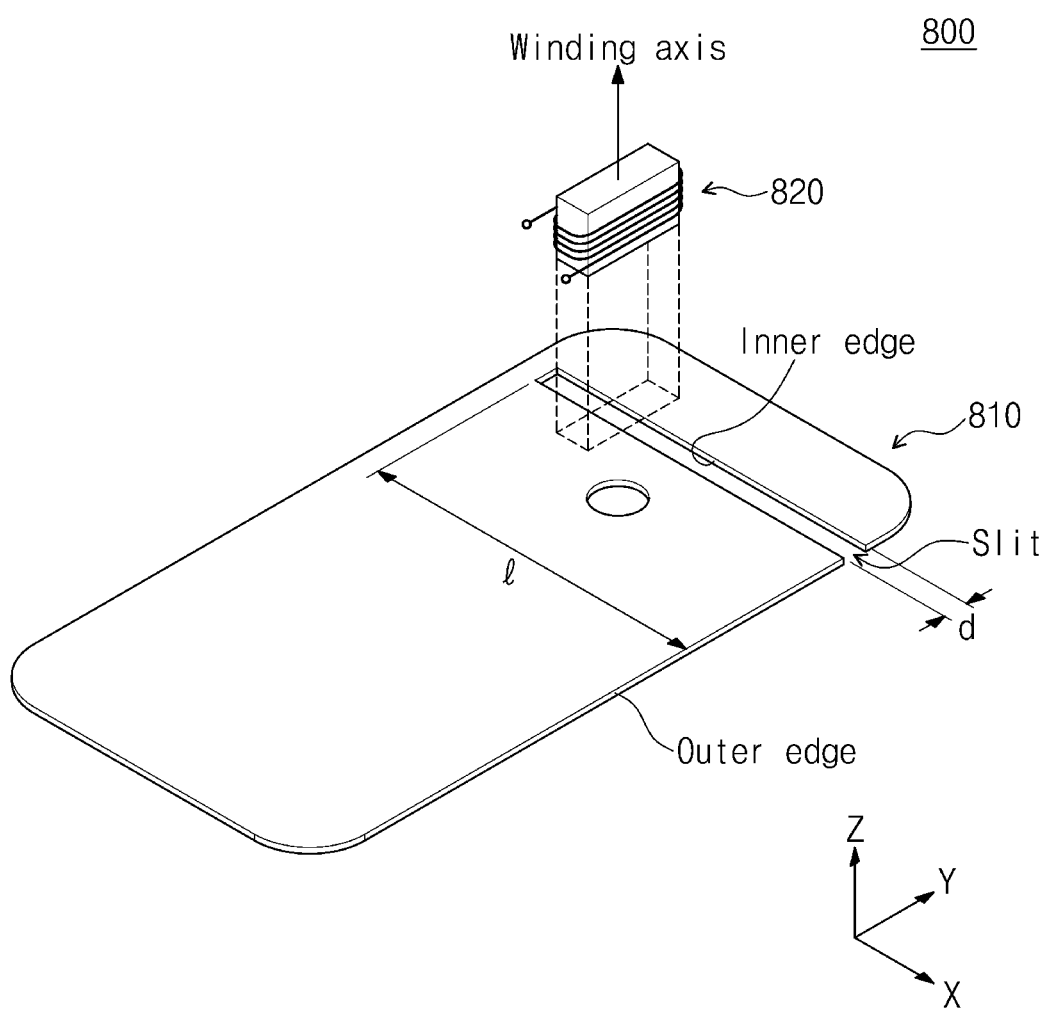
FIG. 10A is a view illustrating an electronic device according to an exemplary embodiment of the inventive concept.

FIG. 10A is a view illustrating an electronic device according to an exemplary embodiment of the inventive concept. Referring to FIG. 10A, an electronic device 800 includes a metal body 810 and an NFC antenna 820. The electronic device 800 further includes an NFC controller, a matching circuit, etc. described with reference to FIG. 8C, and such components are not illustrated in FIG. 10A for ease of illustration.

The metal body 810 may have a form of a plate formed of a metal. The whole appearance of the metal body 810 may be defined by an outer edge thereof. A slit which is defined by an inner edge and extends in the first direction (e.g., the x-axis direction) may be formed in the metal body 810. In this specification, the slit may be referred to as an "opening". A length of the slit may be "l", and a distance thereof may be "d". Although not illustrated in FIG. 10A, the slit may be filled with a nonmetallic material, and thus the nonmetallic material filled in the slit and the metal body 810 may form one plane.

Unlike those described in the previous embodiments, each of the outer edge and the inner edge of the metal body 810 may not form a closed curve. That is, in this embodiment, opposite end points of the outer edge and opposite end points of the inner edge are connected to each other, and thus the outer edge and the inner edge form one closed curve.

The NFC antenna 820 may be implemented by an FPCB antenna or a chip antenna. In FIG. 10A, the NFC antenna 820 is implemented by the chip antenna. A coil of the NFC antenna 820 is illustrated as being wound about a direction (i.e., the z-axis direction) perpendicular to the metal body 810, but a direction of a central axis about which a coil is wound may not be limited thereto. The number of turns of the coil may be determined to satisfy a target inductance value. The NFC antenna 820 is described simply, but since the detailed configuration and arrangement of the NFC antenna 820 implemented by the chip antenna is described in detail in the previous embodiments, a description thereof may not be repeated here.

According to the shape of the metal body 810 and the arrangement of the NFC antenna 820 described with reference to FIG. 10A, an electromagnetic field formed by coupling between the metal body 810 and the NFC antenna 820 may radiate to the outside through the slit. Since the slit is formed such that the metal body 810 is not divided into two pieces, it is easy to manufacture the metal body 810.

Figure 10B:
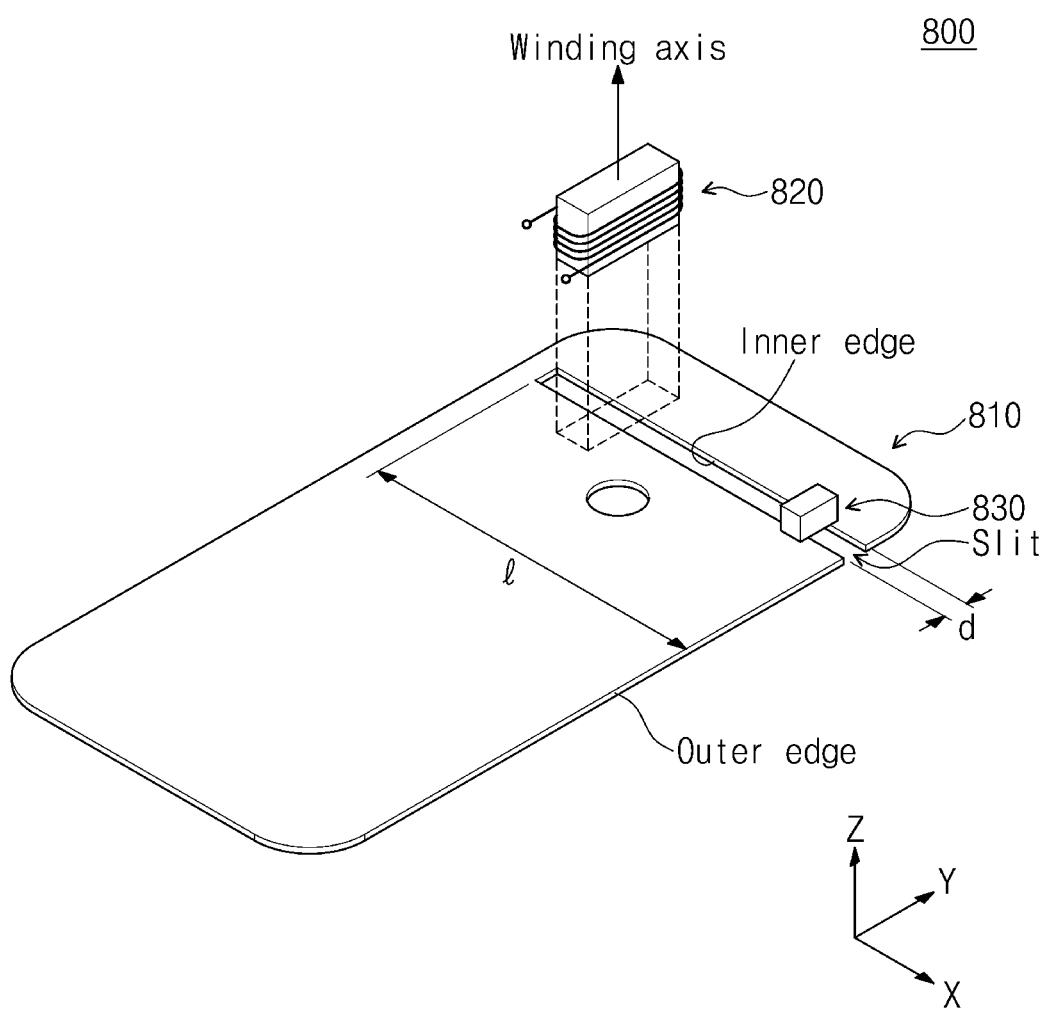
FIG. 10B is a view illustrating an electronic device according to an exemplary embodiment of the inventive concept.

FIG. 10B is a view illustrating an electronic device according to an embodiment of the inventive concept. Referring to FIG. 10B, an electronic device 800 includes a metal body 810, an NFC antenna 820, and a capacitor element 830. The electronic device 800 may be substantially the same as the electronic device 800 illustrated in FIG. 10A except that the electronic device 800 of FIG. 10B further includes the capacitor element 830. Thus, a detailed description thereof may not be repeated here.

The capacitor element 830 may be arranged to connect any two points of the inner edge that define a slit. The capacitor element 830 is illustrated in FIG. 10B as being directly arranged on the metal body 810. However, the capacitor element 830 may be mounted on a separate PCB and may be arranged to connect any two points of the inner edge of the metal body 810.

A closed loop may be formed by the inner edge and the capacitor element 830 by arranging the capacitor element 830 as described above. That is, a current that flows through a coil (i.e., a source coil) of the NFC antenna 820 may cause the generation of an induced current in a closed loop (i.e., a resonance coil) formed by the inner edge and the capacitor element 830, and double resonance may occur at the source coil and the resonance coil. The double resonance is described in detail with reference to FIGS. 8A to 9B. However, the embodiments described with reference to FIGS. 8A to 9B are different from the embodiment of FIG. 10B in that a capacitor is arranged in the hole in the embodiments of FIGS. 8A to 9B. However, the basic principle that resonance occurs at a closed loop formed by an inner edge and a capacitor element is the same, and thus a description thereof is thus omitted.

Figure 11A:
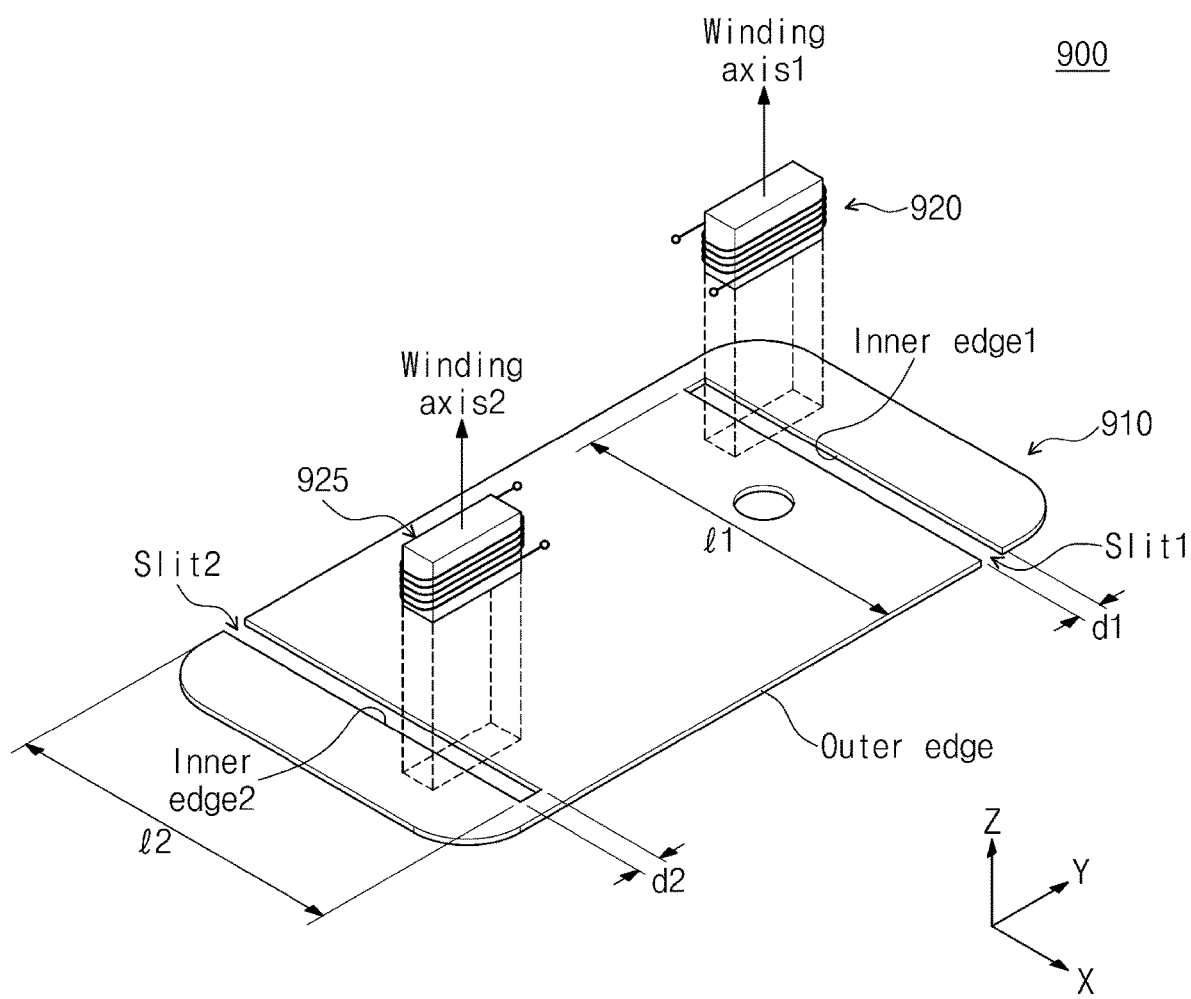
FIG. 11A is a view illustrating an electronic device according to an exemplary embodiment of the inventive concept.

FIG. 11A is a view illustrating an electronic device according to an exemplary embodiment of the inventive concept. Referring to FIG. 11A, an electronic device 900 includes a metal body 910, a first NFC antenna 920, and a second NFC antenna 925. Two slits are formed in the metal body 910, and the embodiment of FIG. 11A is similar to the embodiment of FIG. 10A except that the NFC antennas 920 and 925 are respectively arranged in the two slits. Thus, a detailed description thereof may not be repeated here. In FIG. 11A as an inlet port of a first slit Slit1 faces the +x-axis direction and an inlet port of a second slit Slit2 faces a −x-axis direction. However, directions which slits face may not be limited thereto. For example, both of the first and second slits Slit1, Slit2 may face the same direction.

Figure 11B:
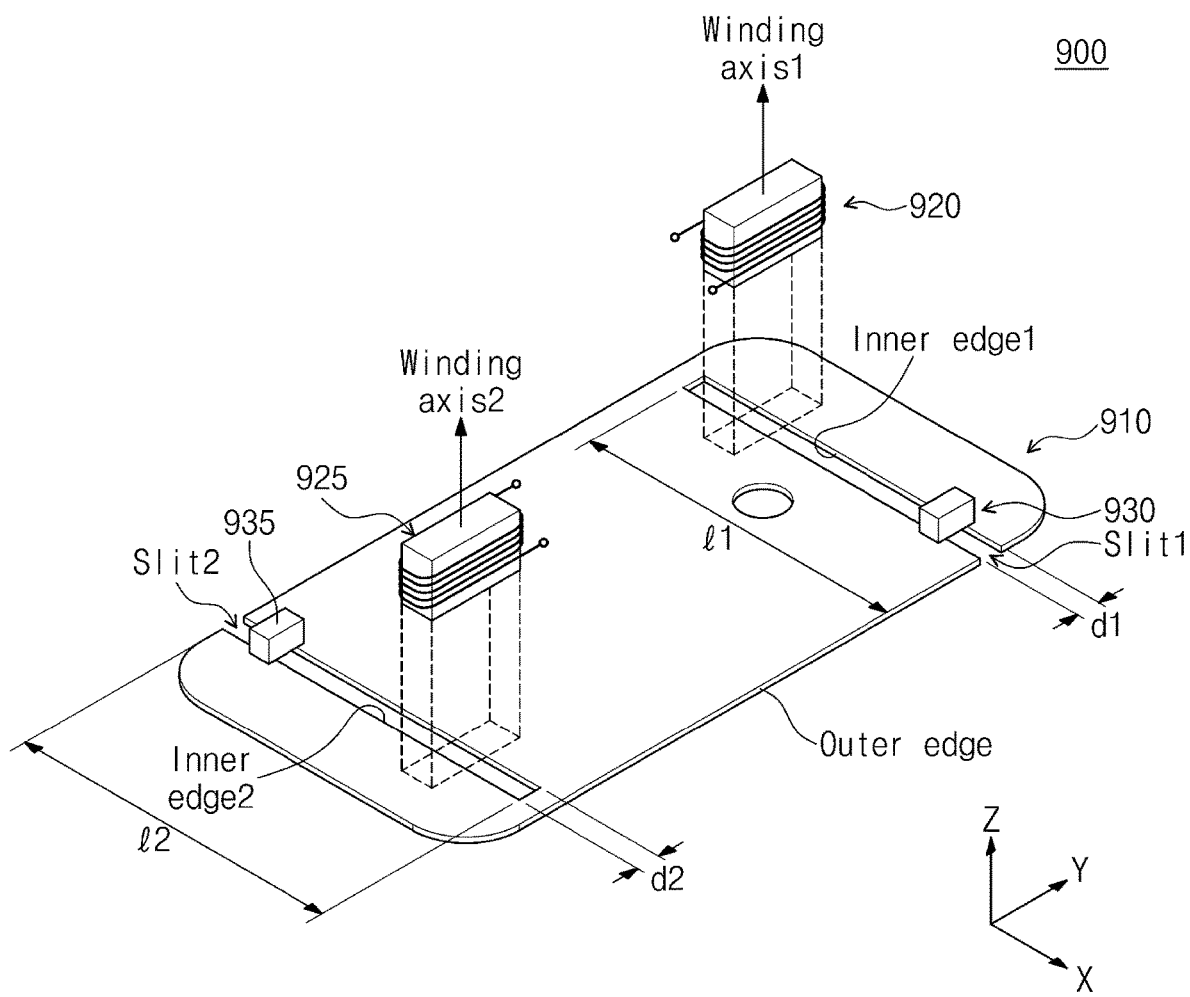
FIG. 11B is a view illustrating an electronic device according to an exemplary embodiment of the inventive concept.

FIG. 11B is a view illustrating an electronic device according to an exemplary embodiment of the inventive concept. An electronic device 900 includes the metal body 910, the NFC antennas 920 and 925 illustrated in FIG. 11A, and capacitor elements 930 and 935. With this configuration, two double resonances may occur. The embodiment of FIG. 11B is similar to the embodiment of FIG. 10B except that the capacitor elements 930 and 935 are respectively arranged in two slits formed in the metal body 910. Thus, a detailed description thereof may not be repeated here.

Figure 12A:
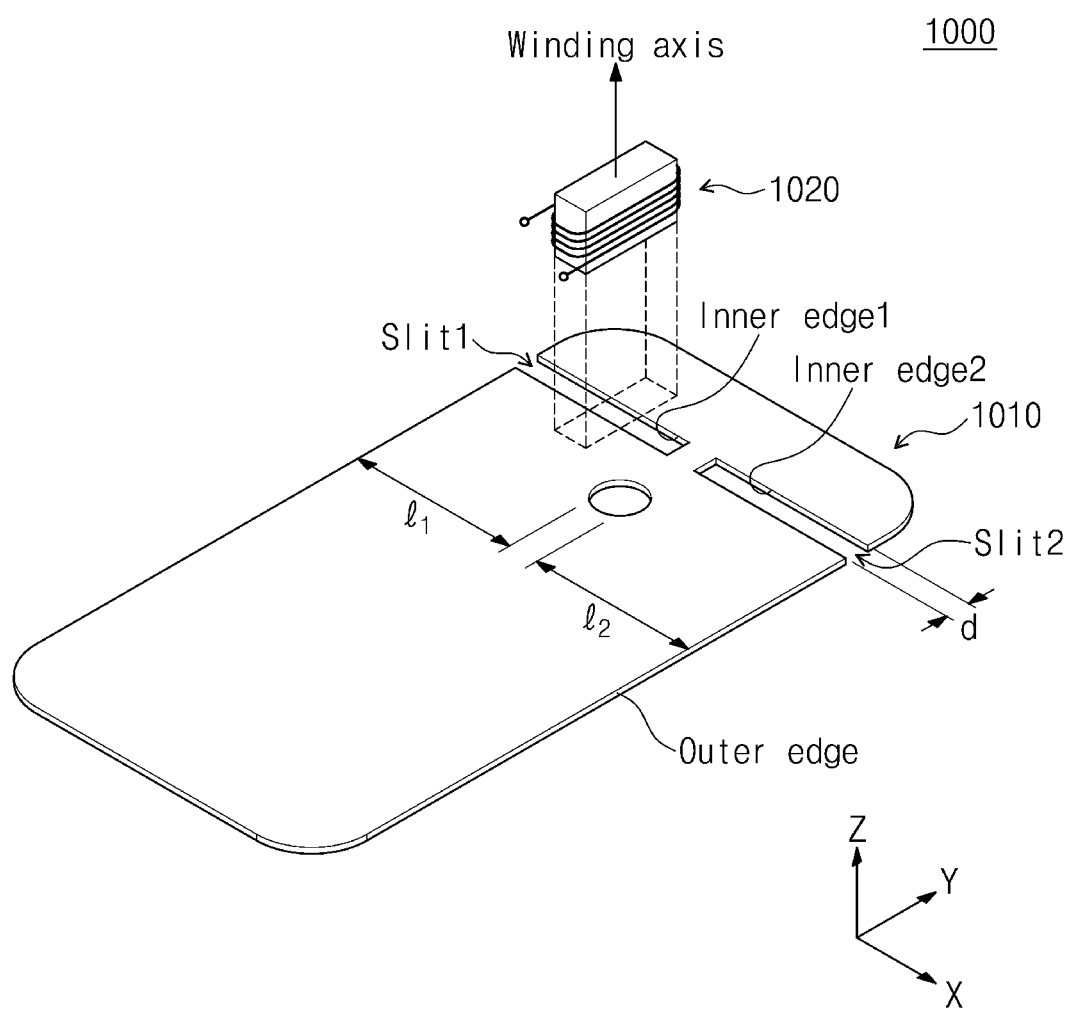
FIG. 12A is a view illustrating an electronic device according to an exemplary embodiment of the inventive concept.

FIG. 12A is a view illustrating an electronic device according to an exemplary embodiment of the inventive concept. In FIG. 12A, an electronic device 1000 includes a metal body 1010 and an NFC antenna 1020.

A first slit and a second slit which are respectively defined by a first inner edge and a second inner edge are formed in the metal body 1010. The first slit and the second slit are formed to extend in the first direction (e.g., the x-axis direction). Lengths of the first and second slits may be "l1" and "l2", and distances thereof may be "d". Each of the first and second inner edges may not form a closed loop. However, the first inner edge, the second inner edge, and an outer edge as a whole may form one closed loop.

The NFC antenna 1020 may be implemented by an FPCB antenna or a chip antenna. In FIG. 12A, the NFC antenna 1020 is implemented by the chip antenna. A coil of the NFC antenna 1020 is illustrated as being wound about a direction (i.e., the z-axis direction) perpendicular to the metal body 1010, but a direction of a central axis about which a coil is wound may not be limited thereto. The number of turns of the coil may be determined to satisfy a target inductance value.

The NFC antenna 1020 may be arranged at any location of the first and second slits along the x-axis direction. For example, in the case where the NFC antenna 1020 is arranged on the first slit, the NFC antenna 1020 may overlap the first slit in a plan view. In the case where the NFC antenna 1020 is arranged on the second slit, the NFC antenna 1020 may overlap the second slit in a plan view. The NFC antenna 1020 may be arranged at the center of the first slit or at the center of the second slit along the y-axis direction. Even though the NFC antenna 1020 is arranged at the first slit or at the second slit, that four cross points are defined by the overlap between the NFC antenna 1020 and the first inner edge or between the NFC antenna 1020 and the second inner edge is the same as that described above.

The NFC antenna 1020 is described simply, but since the detailed configuration and arrangement of the NFC antenna 1020 implemented by the chip antenna is described in detail in the previous embodiments, a description thereof may not be repeated here.

Figure 12B:
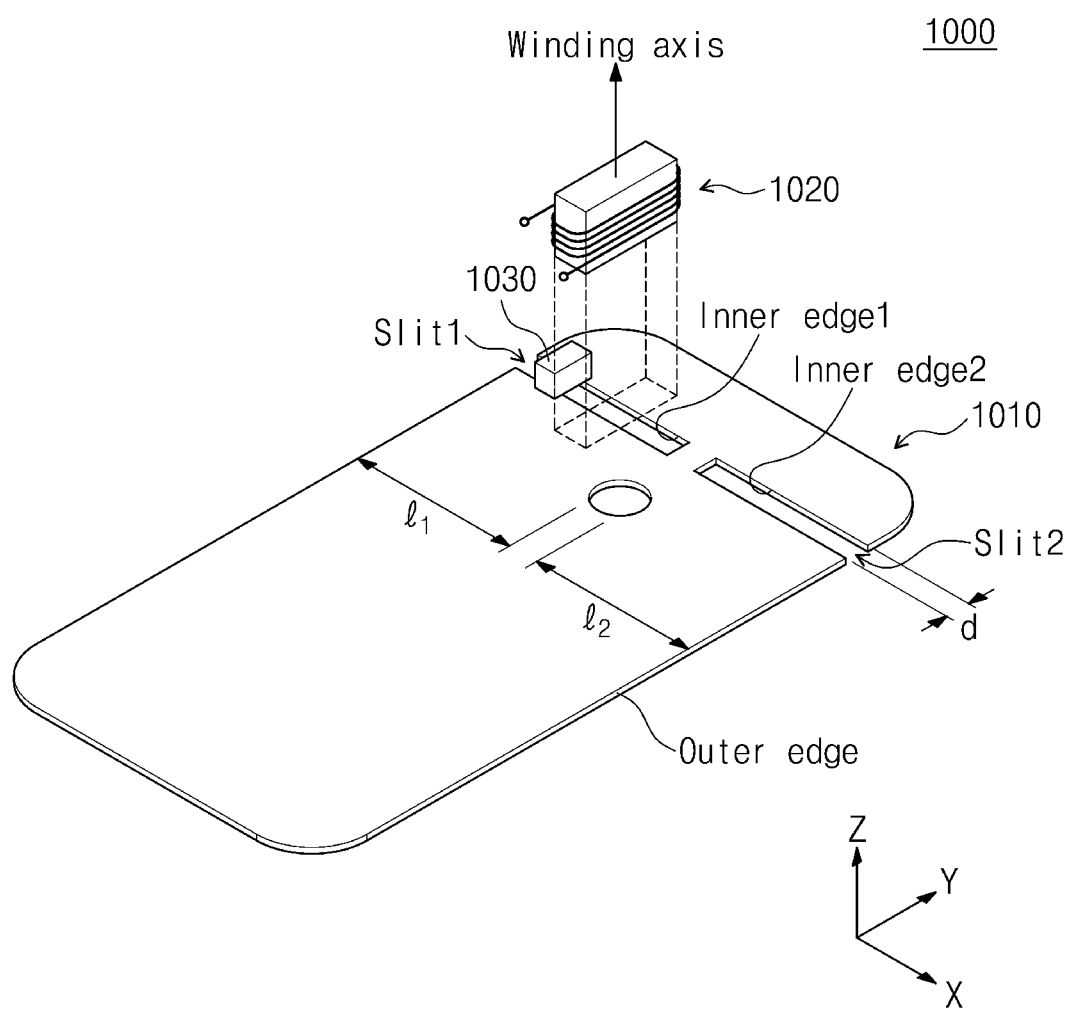
FIG. 12B is a view illustrating an electronic device according to an exemplary embodiment of the inventive concept.

FIG. 12B is a view illustrating an electronic device according to an embodiment of the inventive concept. Referring to FIG. 12B, an electronic device 1000 includes the metal body 1010, the NFC antenna 1020, and a capacitor element 1030. The electronic device 1000 illustrated in FIG. 12B is substantially the same as the electronic device 1000 illustrated in FIG. 12A except that the electronic device 1000 of FIG. 12B further includes the capacitor element 1030. Thus, a detailed description thereof may not be repeated here.

The capacitor element 1030 may be arranged to connect any two points of the first inner edge that defines the first slit. The capacitor element 1030 is illustrated in FIG. 12B as being directly arranged on the metal body 1010. However, the capacitor element 1030 may be mounted on a separate PCB and may be arranged to connect any two points of the first inner edge of the metal body 1010.

A closed loop may be formed by the first inner edge and the capacitor element 1030 by arranging the capacitor element 1030 as described above. The double resonance may occur through the NFC antenna 1020 and the closed loop. The principle that the double resonance occurs is described in detail in the above embodiments. Thus, a detailed description thereof may not be repeated here.

Figure 13A:
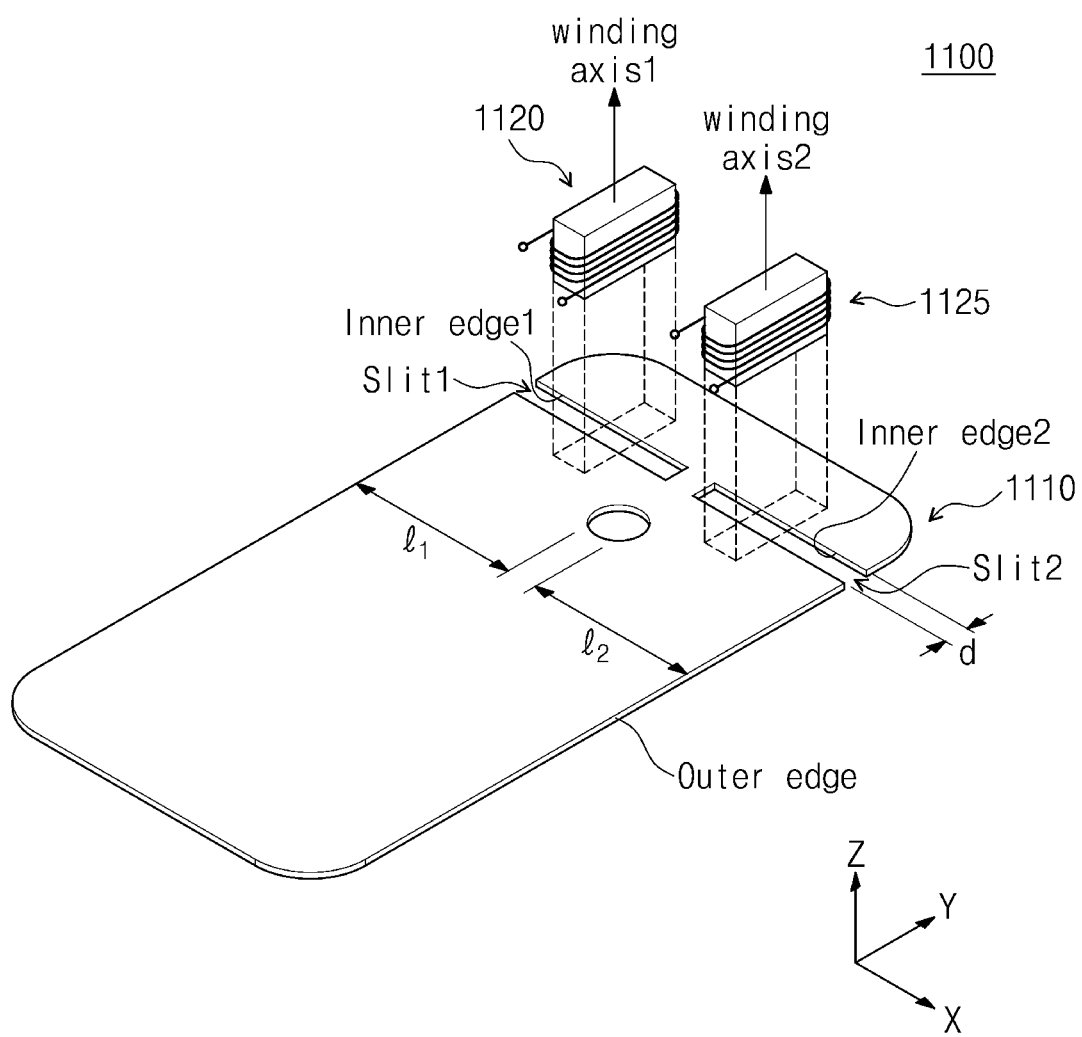
FIG. 13A is a view illustrating an electronic device according to an exemplary embodiment of the inventive concept.

FIG. 13A is a view illustrating an electronic device according to an embodiment of the inventive concept. Referring to FIG. 13A, an electronic device 1100 includes a metal body 1110, a first NFC antenna 1120, and a second NFC antenna 1125.

The metal body 1110 is substantially the same as the metal body 1010 described with reference to FIG. 12A. Thus, a detailed description thereof may not be repeated here.

The first NFC antenna 1120 and the second NFC antenna 1125 are arranged on the metal body 1110 to overlap the first slit and the second slit, respectively. The embodiment of FIG. 13A is similar to the embodiment of FIG. 12A except that the NFC antennas 1120 and 1125 are respectively arranged in the two slits. Thus, a detailed description thereof may not be repeated here.

In FIG. 13A, the first and second NFC antennas 1120 and 1125 are implemented by respectively chip antennas. However, at least one of the first NFC antenna 1120 and the second NFC antenna 1125 may be implemented by an FPCB antenna. Coils of the first and second NFC antennas 1120 and 1125 are illustrated as being wound about a direction (i.e., the z-axis direction) perpendicular to the metal body 1110, but a direction of a central axis about which the coils are wound may not be limited thereto.

Figure 13B:
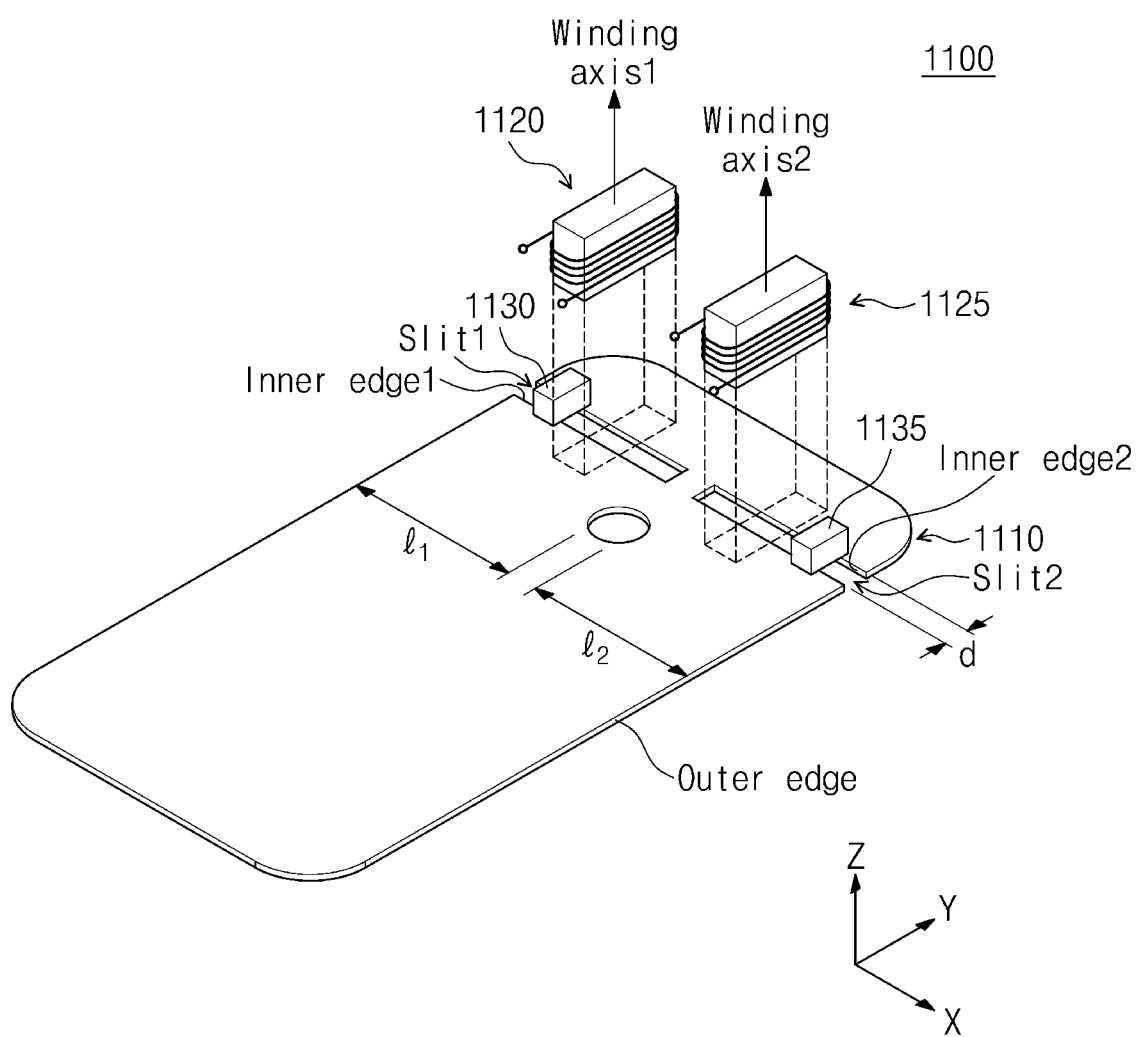
FIG. 13B is a view illustrating an electronic device according to an exemplary embodiment of the inventive concept.

FIG. 13B is a view illustrating an electronic device according to an exemplary embodiment of the inventive concept. Referring to FIG. 13B, an electronic device 1100 includes the metal body 1110, the first NFC antenna 1120, the second NFC antenna 1125, a first capacitor element 1130, and a second capacitor element 1135. The embodiment of FIG. 13B is similar to the embodiment of FIG. 12B except that the capacitor elements 1130 and 1135 are respectively arranged in two slits formed in the metal body 1110. Thus, a detailed description thereof may not be repeated here.

Figure 14A:
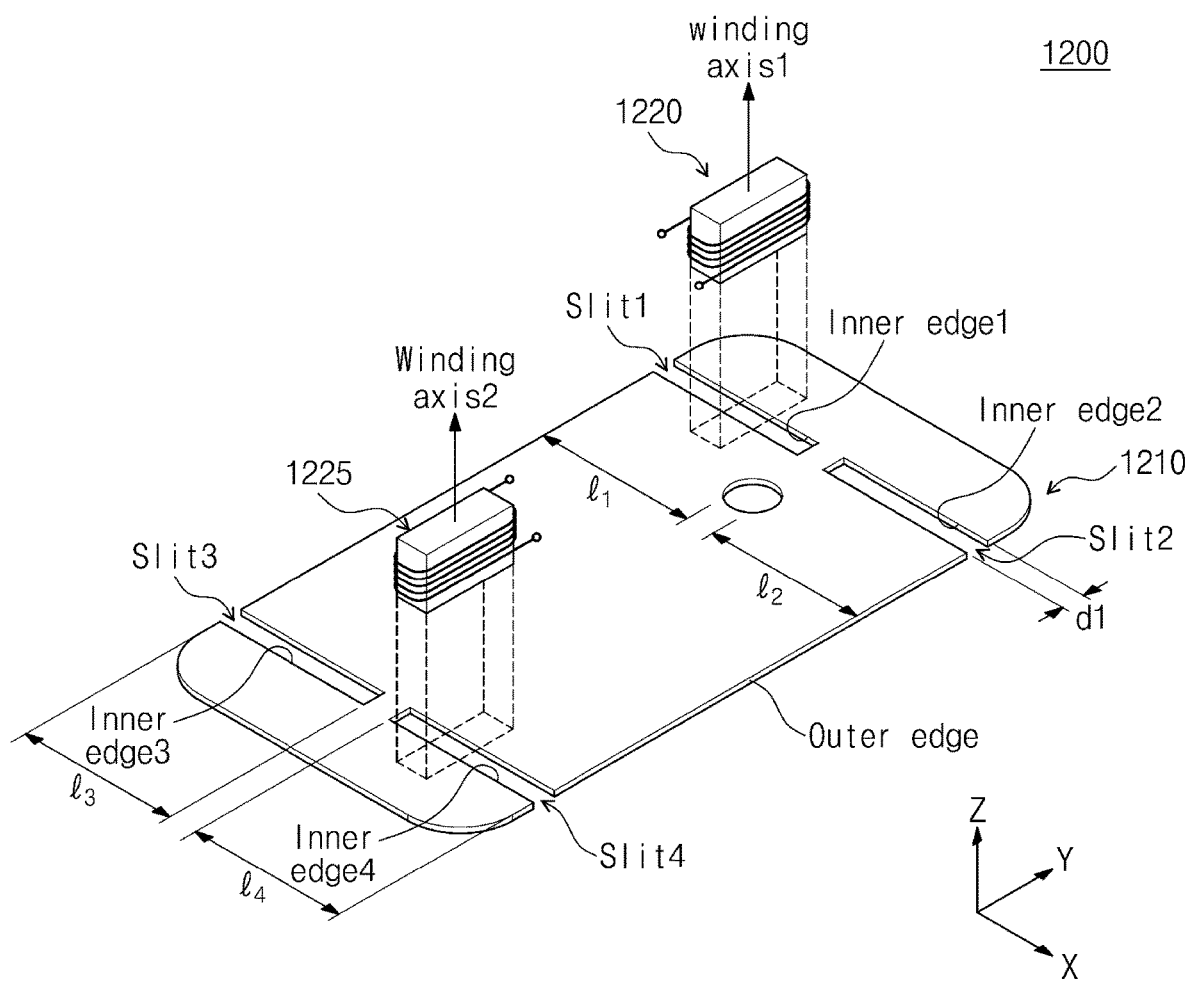
FIG. 14A is a view illustrating an electronic device according to an exemplary embodiment of the inventive concept.

FIG. 14A is a view illustrating an electronic device 1200 according to an exemplary embodiment of the inventive concept. Referring to FIG. 14A, an electronic device 1200 includes a metal body 1210, a first NFC antenna 1220, and a second NFC antenna 1225.

In FIG. 14A, inlet ports of a second slit and a fourth slit face the +x-axis direction and inlet ports of a first slit and a third slit face the −x-axis direction. However, exemplary embodiments of the inventive concept may not be limited thereto. The metal body 1210 is similar to the metal body 1110 of FIG. 13A except that four slits are formed in the metal body 1210. Thus, a detailed description thereof may not be repeated here.

The first NFC antenna 1220 and the second NFC antenna 1225 are arranged on the metal body 1210 to overlap the first slit and the fourth slit, respectively. The NFC antennas 1220 and 1225 are illustrated in FIG. 14A as being arranged in the first slit and the fourth slit. However, the NFC antennas 1220 and 1225 may be arranged at various locations of the first to fourth slits based on the arrangement or spatial usefulness (restriction) of other components included in the electronic device 1200. In FIG. 14A, the two NFC antennas 1220 and 1225 are arranged. However, exemplary embodiments of the inventive concept may not be limited thereto. For example, three or more NFC antennas may be respectively arranged in a plurality of slits, respectively.

In FIG. 14A, the first and second NFC antennas 1220 and 1225 are implemented by respectively chip antennas. However, at least one of the first NFC antenna 1220 and the second NFC antenna 1225 may be implemented by an FPCB antenna. Coils of the first and second NFC antennas 1220 and 1225 are illustrated as being wound about a direction (i.e., the z-axis direction) perpendicular to the metal body 1210, but a direction of a central axis about which the coils are wound may not be limited thereto.

Figure 14B:
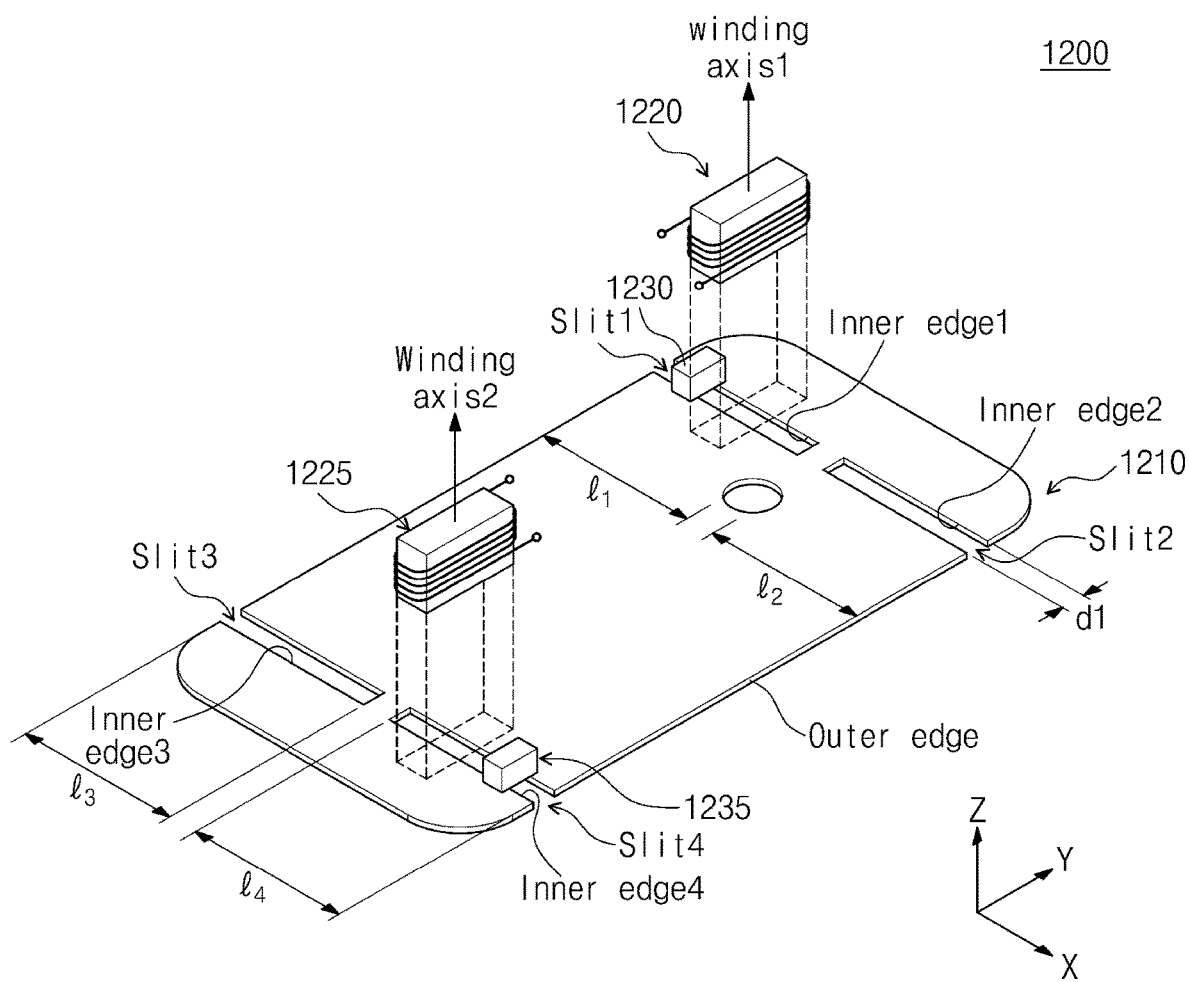
FIG. 14B is a view illustrating an electronic device according to an exemplary embodiment of the inventive concept.

FIG. 14B is a view illustrating an electronic device according to an exemplary embodiment of the inventive concept. Referring to FIG. 14B, an electronic device 1200 includes the metal body 1210, the first NFC antenna 1220, the second NFC antenna 1225, a first capacitor element 1230, and a second capacitor element 1235. The embodiment of FIG. 14B is similar to the embodiment of FIG. 12B except that the capacitor elements 1230 and 1235 are respectively arranged in the first and fourth slits formed in the metal body 1210. Also, that two double resonances occur by providing two capacitor elements 1230 and 1235 is described in the previous embodiments. Thus, a detailed description thereof may not be repeated here.

Figure 15A:
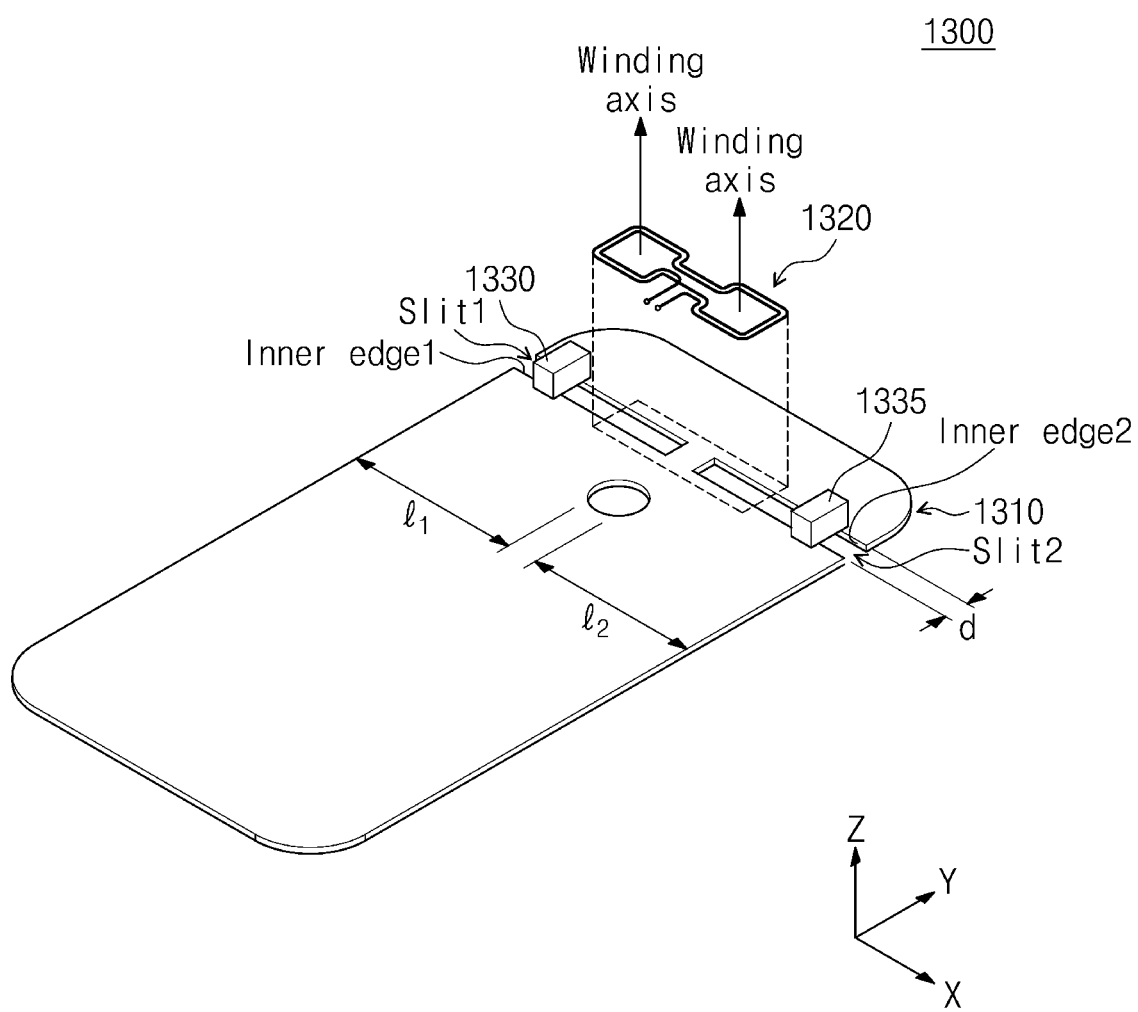
FIG. 15A is a view illustrating an electronic device according to an exemplary embodiment of the inventive concept.
Figure 15B:
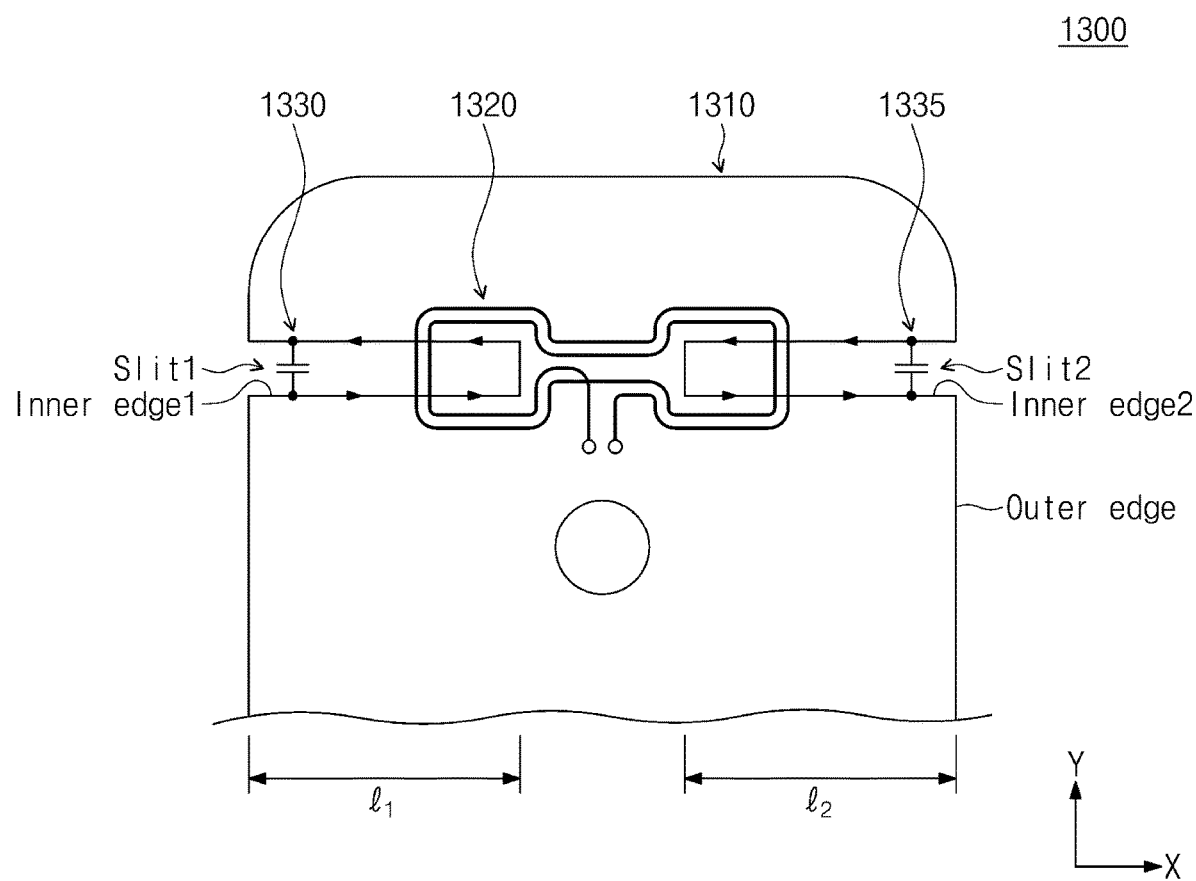
FIG. 15B is a plan view illustrating the electronic device illustrated in FIG. 15A, according to an exemplary embodiment of the inventive concept.

FIG. 15A is a view illustrating an electronic device according to an exemplary embodiment of the inventive concept. FIG. 15B is a plan view illustrating an electronic device 1300 illustrated in FIG. 15A. The electronic device 1300 includes a metal body 1310, an NFC antenna 1320, a first capacitor element 1330, and a second capacitor element 1335. The metal body 1310 in which a first slit and a second slit are formed is substantially the same as the metal bodies described with reference to FIGS. 12A to 14B, and thus a duplicated description thereof is not repeated here. Also, the arrangement of the first and second capacitor elements 1330 and 1335 and formation of a closed loop thereby are described in the above embodiments, and thus a description thereof is not repeated here.

Referring to FIGS. 15A and 15B, the NFC antenna 1320 includes one coil and is arranged to overlap both a first slit and a second slit in a plan view. For example, the NFC antenna 1320 is implemented by an FPCB antenna. A coil is wound such that a portion at which the NFC antenna 1320 and the first slit overlap each other and the NFC antenna 1320 and the second slit overlap each other has a relatively larger area. In contrast, the coil is wound such that a portion at which the NFC antenna 1320 and the metal body 1310 overlap each other has a relatively small area. As a result, two double resonance may occur through one coil.

Meanwhile, like the embodiment illustrated in FIGS. 15A and 15B, even though one NFC antenna 1320 overlaps two slits, four cross points may be defined by the overlap. Although cross points are not illustrated in FIGS. 15A and 15B, cross points formed by the overlap between the NFC antenna 1320 and the first and second slits may be substantially similar to the cross points described with reference to FIG. 2B. Thus, a detailed description thereof may not be repeated here.

Figure 15C:
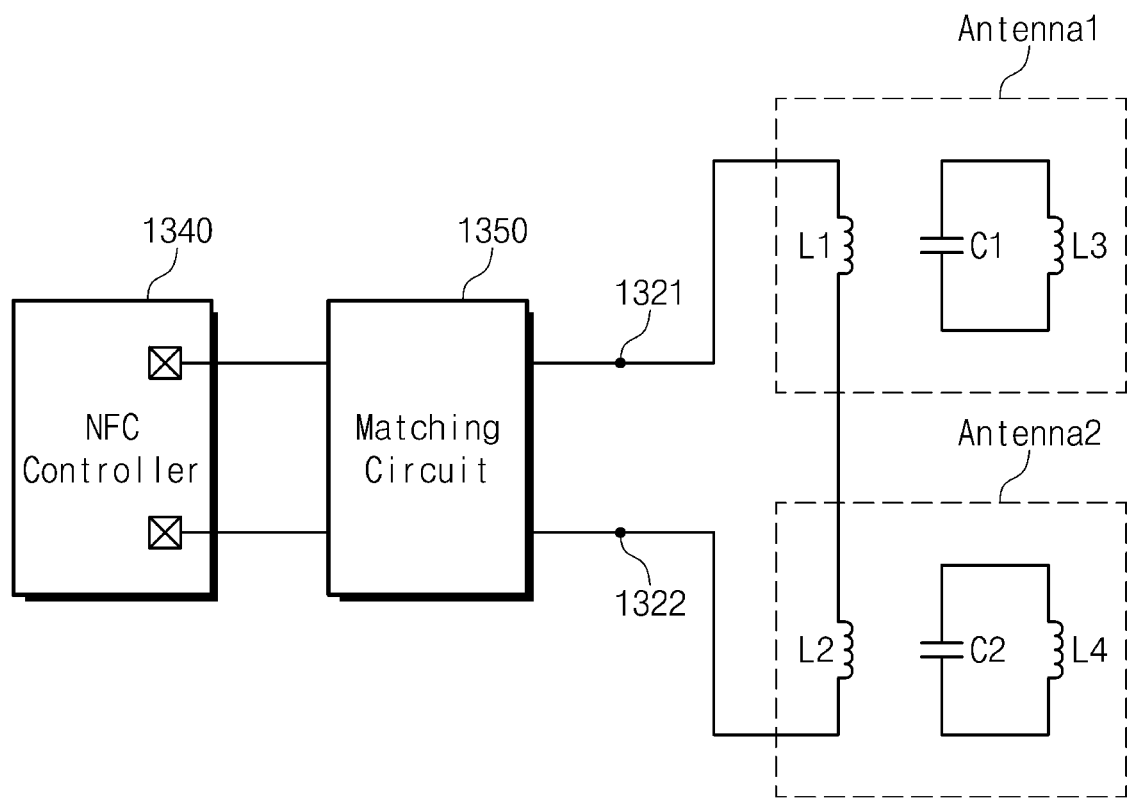
FIG. 15C is a circuit diagram illustrating a simplified modeling circuit of an electronic device including a metal body, an NFC antenna, and capacitors illustrated in FIG. 15B, according to an exemplary embodiment of the inventive concept.

FIG. 15C is a circuit diagram illustrating a simplified modeling circuit of an electronic device including the metal body, the NFC antenna, and the capacitors illustrated in FIG. 15B. Although not illustrated in FIG. 15B, the electronic device 1300 of FIG. 15C is illustrated as further including an NFC controller 1340 and a matching circuit 1350. The configurations and functions of the NFC controller 1340 and the matching circuit 1350 are described in the previous embodiments, and thus a detailed description thereof is thus omitted. A description will be given with reference to FIGS. 15B and 15C for better understanding.

First of all, components of a first antenna, Antenna 1, are described. An inductor L1 may correspond to a portion of the NFC antenna 1320, which overlaps the first slit of FIG. 15B. The NFC antenna 1320 may further include its own parasitic capacitance component, but it is omitted for ease of illustration. A capacitor C1 may correspond to the first capacitor element 1330 of FIG. 15B. The capacitor C1 may include a parasitic capacitance component and the like that the metal body 1310 has in itself. An inductor L3 may correspond to an inductance component generated by a first closed loop which is formed by the first slot and the first capacitor element 1330.

Next, components of a second antenna, Antenna 2, are described. An inductor L2 may correspond to a portion of the NFC antenna 1320, which overlaps the second slit of FIG. 15B. A capacitor C2 may correspond to the second capacitor element 1335 of FIG. 15B. An inductor L4 may correspond to an inductance component generated by a second closed loop which is formed by the second slit and the second capacitor element 1335.

The NFC antenna 1320 illustrated as the inductors L1 and L2 may be connected to the matching circuit 1350 through terminals 1321 and 1322. This modeling is only exemplary, and the modeling circuit of the electronic device 1300 may take a different structure or may be implemented in a manner different from that described above.

With the above-described configuration, it may be possible to implement two double resonances by using one NFC antenna, two slits, and two capacitor elements. For example, the number of turns of a coil, the area of a portion at which an NFC antenna overlaps a slit, a distance of a slit, a length of a slit, a capacity of a capacitor element, etc. may be appropriately determined such that each of the first and second antennas shows the performance suitable for any specific purpose.

Figure 16:
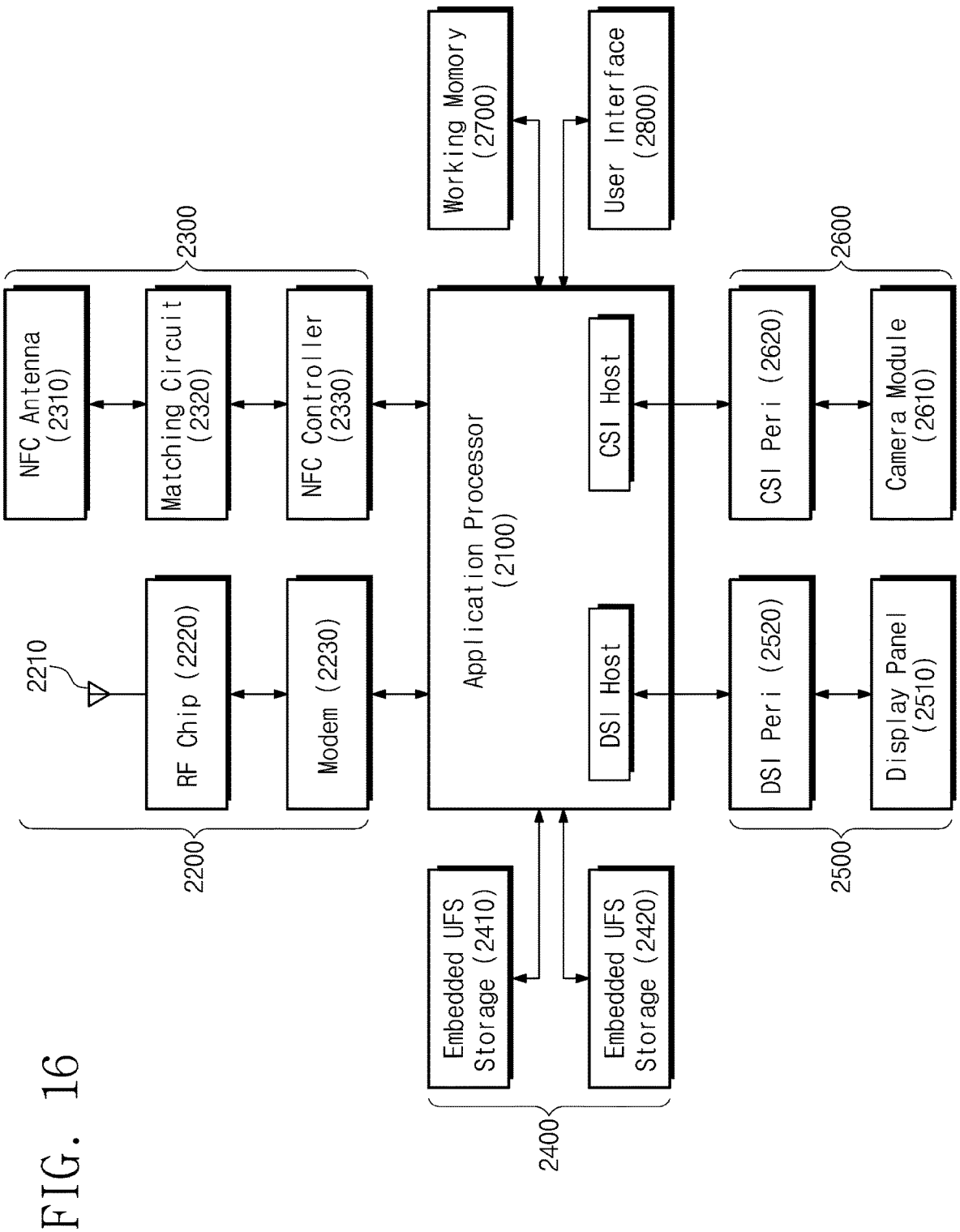
FIG. 16 is a block diagram illustrating a mobile device to which the embodiments of the inventive concept are applied.

FIG. 16 is a block diagram illustrating a mobile device to which the above embodiments of the inventive concept are applied. Referring to FIG. 16, an electronic device 2000 may be implemented to support a mobile industry processor interface (MIPI) standard or an embedded DisplayPort (eDP) standard. The electronic device 2000 may include an application processor 2100, a wireless transceiver unit 2200, an NFC communication unit 2300, data storage 2400, a display unit 2500, an image processing unit 2600, a working memory 2700, and a user interface 2800.

The application processor 2100 may control overall operations of the electronic device 2000. The application processor 2100 may include a Display Serial Interface (DSI) host interfacing with the display unit 2500 and a Camera Serial Interface (CSI) host interfacing with the image processing unit 2600.

The wireless transceiver unit 2200 may include a main antenna 2210, a radio frequency (RF) chip 2220, and a modulator/demodulator (modem) 2230. For example, the modem 2230 may communicate with the application processor 2100 through an M-PHY layer. According to an embodiment, however, the modem 2230 may be embedded in the application processor 2100 so as to be integrated into one chip together with the application processor 2100. For example, the main antenna 2210 may be implemented at a part of a metal body surrounding the electronic device 2000.

The wireless communication device 2300 may include an NFC antenna 2310, a matching circuit 2320, and an NFC controller 2330. For example, the NFC antenna 2310 may be arranged to overlap a hole or a slit formed in the metal body surrounding the electronic device 2000. For example, NFC communication by the double resonance may be implemented by further arranging a capacitor in the hole or slit formed in the metal body.

The data storage 2400 may include an embedded universal flash storage (UFS) storage 2410 and a removable UFS card 2420. The embedded UFS storage 2410 and the removable UFS card 2420 may perform communication with the application processor 2100 through the M-PHY layer. Meanwhile, a host (i.e., the application processor 2100) may include a bridge that communicates with the removable UFS card 2420 based on a protocol different from a UFS protocol. The application processor 2100 and the removable UFS card 2420 may communicate with each other through various card protocols (e.g., a universal serial bus (USB) flash drive (UFD), a multimedia card (MMC), an embedded multimedia card (eMMC), a secure digital (SD), a mini SD, a Micro SD, etc.) The embedded UFS storage 2410 and the removable UFS card 2420 may be implemented with a three-dimensional nonvolatile memory device in which a cell string including memory cells is formed to be perpendicular to a substrate. The removable UFS card 2420 is illustrated in FIG. 16 as being detached and attached through a slot provided in the application processor 2100. However, according to an exemplary embodiment, the removable UFS card 2420 may be detached and attached from and to the embedded UFS storage 2410 through a slot provided in the embedded UFS storage 2410.

The display unit 2500 may include a display panel 2510 and a DSI peripheral circuit 2520. The display panel 2510 may display image data. A DSI host embedded in the application processor 2100 may perform serial communication with the display panel 2510 through a DSI. The DSI peripheral circuit 2520 may include a timing controller, a source driver, and the like, which are needed to drive the display panel 2510.

The image processing unit 2600 may include a camera module 2610 and a CSI peripheral circuit 2620. The camera module 2610 and the CSI peripheral circuit 2620 may include a lens, an image sensor, an image processor, and the like. Image data generated by the camera module 2610 may be processed by the image processor 2600, and the processed image may be provided to the application processor 2100 through a CSI.

The working memory 2700 may temporarily store data processed by the application processor 2100. The working memory 2700 may include a volatile memory, such as a static random access memory (SRAM), a dynamic RAM (DRAM), a synchronous DRAM (SDRAM), or a nonvolatile memory, such as a flash memory, a phase change RAM (PRAM), a magneto-resistive RAM (MRAM), a resistive RAM (Re RAM), or a ferroelectric RAM (FRAM).

The user interface 2800 may include various devices (e.g., a microphone, a speaker, etc.) for convenience of a user.

According to exemplary embodiments of the inventive concept, there is provided an electronic device that performs NFC efficiently by using a metal body.

In addition, according to exemplary embodiments of the inventive concept, there is provided an electronic device of which the performance is improved through an NFC antenna and a metal body for generating a double resonance.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:
1. An electronic device comprising:
a metal body including a first opening having a first length in a first direction and a first distance in a second direction and a second opening having a second length in the first direction and a second distance in the second direction;
a first near field communication (NFC) antenna which corresponds to the first opening, and at least a part of which is arranged to overlap the first opening when the first opening is viewed in a direction perpendicular to a plane where the first opening is formed; and
a first capacitor element which connects two points of the first opening of the metal body,
wherein the first NFC antenna is implemented by a flexible printed circuit board (FPCB) antenna.

2. The electronic device of claim 1, wherein the first opening and the second opening are arranged along the same line in the first direction.

3. The electronic device of claim 1, wherein the first NFC antenna comprising:
a magnetic sheet; and
an FPCB which is arranged on the magnetic sheet and on which a coil is arranged.

4. The electronic device of claim 3, wherein the magnetic sheet comprises at least one of ferrite, Nd—Fe—B, samarium, Al—Ni—Co, sendust (Fe—Si—Al), and permalloy (Ni—Fe).

5. The electronic device of claim 1, wherein a ratio of the first length to a length of the first NFC antenna in the first direction is not less than 4.5:1 and less than 1:1.

6. The electronic device of claim 3, further comprising:
a matching circuit connected to opposite ends of the coil; and
an NFC controller connected to the matching circuit and configured to transmit and receive NFC signals through inductive coupling between the coil and the metal body.

7. The electronic device of claim 1, wherein the first opening is defined by a first inner edge of the metal body, and
wherein the first inner edge is connected with an outer edge of the metal body.

8. The electronic device of claim 1, further comprising:
a second NFC antenna which corresponds to the second opening, and at least a part of which is arranged to overlap the second opening when the second opening is viewed in a direction perpendicular to a plane where the second opening is formed; and
a second capacitor element which connects two points of the second opening of the metal body,
wherein the second NFC antenna is substantially identical to the first NFC antenna.

9. An electronic device comprising:
a metal body including a first hole having a first length in a first direction and a first distance in a second direction and a second hole having a second length in the first direction and a second distance in the second direction;
a first near field communication (NFC) antenna which corresponds to the first hole, and at least a part of which is arranged to overlap the first hole when the first hole is viewed in a direction perpendicular to a plane where the first hole is formed; and
a first capacitor element which connects two points of the first hole of the metal body,
wherein the first NFC antenna is implemented by a flexible printed circuit board (FPCB) antenna.

10. The electronic device of claim 9, wherein the first hole and the second hole are arranged along the same line in the first direction.

11. The electronic device of claim 9, wherein the first NFC antenna comprising:
a magnetic sheet; and
an FPCB which is arranged on the magnetic sheet and on which a coil is arranged.

12. The electronic device of claim 9, wherein the first hole is defined by a first inner edge of the metal body, and
wherein the first inner edge is not connected with an outer edge of the metal body.

13. The electronic device of claim 9, further comprising:
a second NFC antenna which corresponds to the second hole, and at least a part of which is arranged to overlap the second hole when the second hole is viewed in a direction perpendicular to a plane where the second hole is formed; and
a second capacitor element which connects two points of the second hole of the metal body,
wherein the second NFC antenna is substantially identical to the first NFC antenna.

14. An electronic device comprising:
a metal body comprising a first slit extending in a first direction and defined by a first inner edge thereof, and a second slit extending in the first direction and defined by a second inner edge thereof; and
a first near field communication (NFC) antenna comprising a first coil wound about a central axis and is arranged near the metal body to overlap the first slit in a plan view of the metal body,
wherein each of the first inner edge and the second inner edge is connected with an outer edge of the metal body, and the first NFC antenna is arranged at a center of the first slit along a second direction.

15. The electronic device of claim 14, further comprising a first capacitor element which connects two points of the first inner edge.

16. The electronic device of claim 14, further comprising:
a second NFC antenna comprising a second coil wound about the central axis and is arranged on the metal body to overlap the second slit in the plan view,
wherein the second NFC antenna is arranged at the center of the second slit along the second direction.

17. The electronic device of claim 16, wherein each of the first NFC antenna and the second NFC antenna is implemented by a flexible printed circuit board (FPCB) antenna or a chip antenna.

18. The electronic device of claim 16, further comprising:
a first capacitor element which connects two points of the first inner edge; and
a second capacitor element which connects two points of the second inner edge.

19. The electronic device of claim 18, wherein the number of turns of the first coil is the same as or different from the number of turns of the second coil, and
wherein a length of the first slit is the same as or different from a length of the second slit.

20. The electronic device of claim 14, wherein the first slit and the second slit are arranged along the same line in the first direction.

* * * * *